US009777951B2

(12) United States Patent
Hasegawa et al.

(10) Patent No.: US 9,777,951 B2
(45) Date of Patent: Oct. 3, 2017

(54) THERMOACOUSTIC ENGINE

(71) Applicant: Tokai University Educational System, Tokyo (JP)

(72) Inventors: Shinya Hasegawa, Kanagawa (JP); Yasuo Oshinoya, Kanagawa (JP); Tsuyoshi Yamaguchi, Kanagawa (JP); Tomohiro Kaneko, Kanagawa (JP)

(73) Assignee: Tokai University Educational System, Tokyo (JP)

( * ) Notice: Subject to any disclaimer, the term of this patent is extended or adjusted under 35 U.S.C. 154(b) by 327 days.

(21) Appl. No.: 14/362,973

(22) PCT Filed: Nov. 30, 2012

(86) PCT No.: PCT/JP2012/081193
§ 371 (c)(1),
(2) Date: Jun. 5, 2014

(87) PCT Pub. No.: WO2013/084830
PCT Pub. Date: Jun. 13, 2013

(65) Prior Publication Data
US 2014/0338369 A1 Nov. 20, 2014

(30) Foreign Application Priority Data

Dec. 5, 2011 (JP) ................................. 2011-266181

(51) Int. Cl.
*F25B 9/12* (2006.01)
*F25B 9/14* (2006.01)
*F02G 1/043* (2006.01)

(52) U.S. Cl.
CPC .............. *F25B 9/145* (2013.01); *F02G 1/043* (2013.01); *F25B 2309/1403* (2013.01)

(58) Field of Classification Search
CPC ...... F25B 2309/1409; F25B 2309/1413; F25B 2309/1414; F25B 2309/1425; F25B 2309/1427

(Continued)

(56) References Cited

U.S. PATENT DOCUMENTS

| 5,901,556 A * | 5/1999 | Hofler .................... F03G 7/002 62/467 |
| 6,032,464 A * | 3/2000 | Swift ........................ F02G 1/02 60/520 |
| 2007/0220903 A1* | 9/2007 | Watanabe ................ F25B 9/10 62/6 |

FOREIGN PATENT DOCUMENTS

| JP | 2006-118728 A | 5/2006 |
| JP | 2006-214406 A | 8/2006 |

(Continued)

OTHER PUBLICATIONS

JP2010261687A Translation.*

(Continued)

*Primary Examiner* — Frantz Jules
*Assistant Examiner* — Brian King
(74) *Attorney, Agent, or Firm* — Capitol City TechLaw, PLLC; Samuel P. Burkholder

(57) ABSTRACT

Disclosed is a thermoacoustic engine having: resonance pipes including a working gas; motors; and a branch pipe, where each of the motors has a regenerator, a heater, and a cooler, a temperature gradient is given between both ends of the regenerator to generate self-excited oscillation of the working gas, a channel cross-sectional area of the resonance pipe that is coupled to the heater is expanded by a same amplification factor of a work flow based on the self-excited oscillation or by an amplification factor within a range of ±30% of the amplification factor of the work flow to a channel cross-sectional area of a resonance pipe that is coupled to the cooler, and a channel cross-sectional area of the regenerator is set by 4 to 36 times of the channel cross-sectional area of the resonance pipe that is coupled to the cooler.

3 Claims, 9 Drawing Sheets

(58) Field of Classification Search
USPC .............................................................. 62/6
See application file for complete search history.

(56) References Cited

FOREIGN PATENT DOCUMENTS

| | | |
|---|---|---|
| JP | 2009-074734 A | 4/2009 |
| JP | 2010-261687 A | 11/2010 |

OTHER PUBLICATIONS

JP2006214406 Translation.*
Miwa, M. et al., "Measurement of acoustic output power in a traveling wave engine," Ultrasonics, Sep. 2006, pp. 1527-1529, vol. 44, Elsevier B.V.
Gardner, D.L., et al., "A cascade thermoacoustic engine," J. Acoust. Soc. Am., Oct. 2003, pp. 1905-1919, vol. 144, No. 4, Pt. 1, Acoustical Society of America.
Biwa, T., et al., "Low temperature differential thermoacoustic Stirling engine," Applied Physics Letters, Jul. 20, 2010, pp. 034102, vol. 97, American Institute of Physics.
Backhaus, S., et al., "Traveling-wave thermoacoustic electric generator," Applied Physics Letters, Aug. 9, 2004, pp. 1085-1087, vol. 85, No. 6, American Institute of Physics.

* cited by examiner

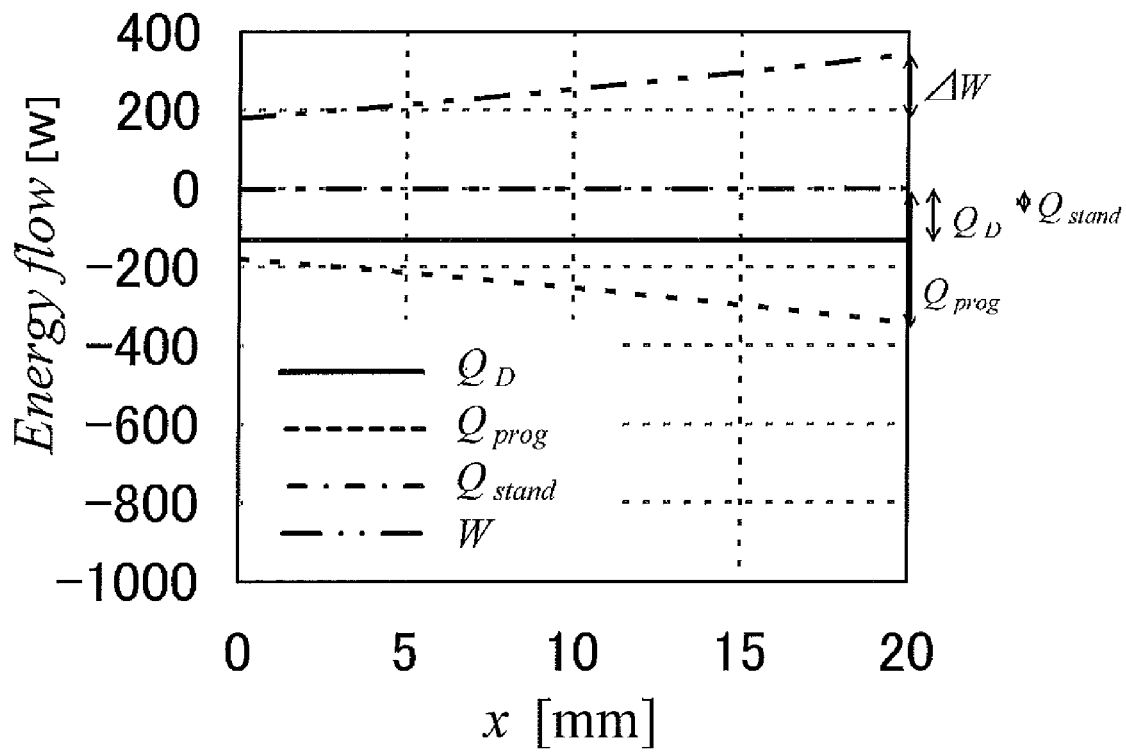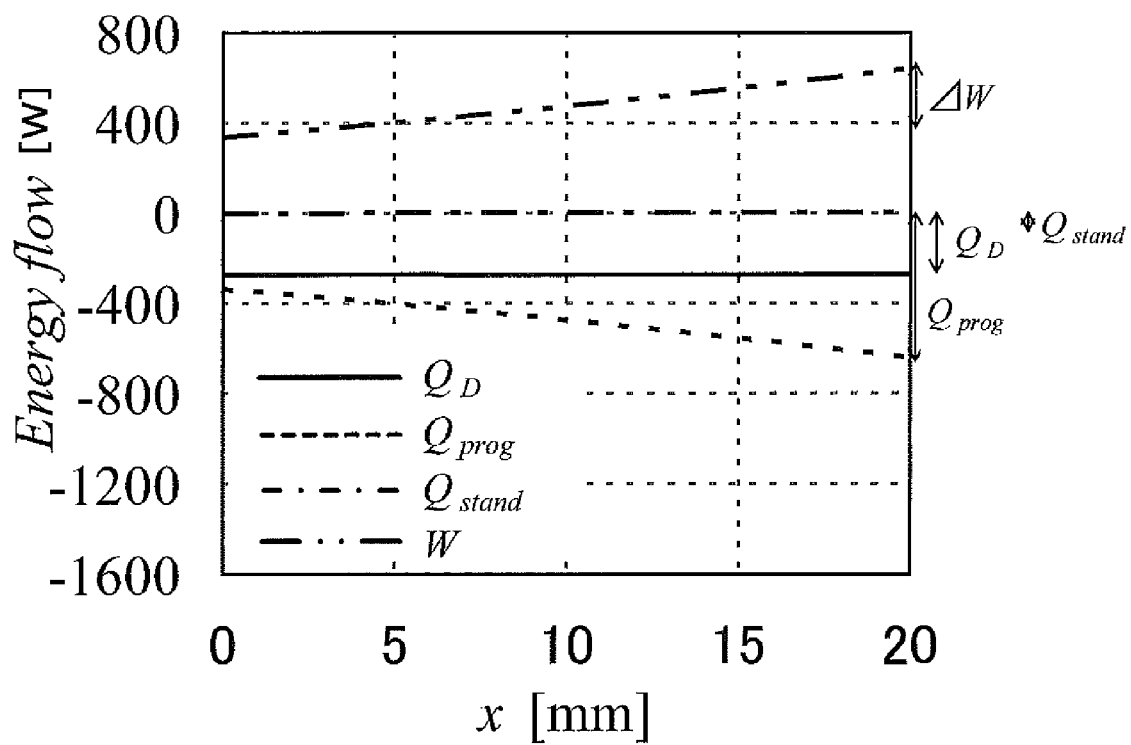

THERMOACOUSTIC ENGINE

TECHNICAL FIELD

The invention relates to a thermoacoustic engine which generates self-excited oscillation of a working gas.

BACKGROUND ART

In recent years, global warming and energy problems have become increasingly serious. If a great amount of waste heat generated in plants or vehicles, or solar energy can be recovered with high efficiency, it may be a last resort for solving the global warming and the energy problems. In order to recover the energy to convert the recovered energy to power, researches on thermoacoustic engines have been actively conducted.

A thermoacoustic engine uses self-excited oscillation generated in a pipe. Shortly, a bundle of narrow channels (hereinafter, referred to as a regenerator) is installed in the pipe. When a temperature ratio at both ends of the regenerator is set at or above a certain critical value, a fluid in the pipe causes the self-excited oscillation. This effect can be thermodynamically regarded as a motor without moving parts and the thermoacoustic engine is realized by using the effect (for example, see Patent Documents 1 and 2). Since the thermoacoustic engine is an external engine which is driven in the Stirling cycle, there is a possibility that work can be extracted with high-efficiency from any heat sources such as sunlight and industrial waste heat. Also, since the thermoacoustic engine has a simple structure which exchanges heat by use of sound waves, any moving parts such as pistons and turbines are not necessary at all, which is different from the usual Stirling engine. Therefore, advantages of inexpensiveness, a long service life and maintenance-free can be obtained.

A structure of a typical thermoacoustic engine (for example, see Non-Patent Document 1) is illustrated in FIGS. 10A and 10B, which has been researched for aiming at practical use in recent years. A thermoacoustic generator 500 illustrated in FIG. 10A is provided with a loop pipe 100 and a resonance pipe 111. In the loop pipe 100, a regenerator 210, a heater 220 and a cooler 230 forming a motor 200 are provided. A generator (linear generator) 300 is provided at one end of the resonance pipe 111. In the thermoacoustic generator 500, when a temperature gradient is given to the regenerator 210, self-excited oscillation as sound waves (that is, thermoacoustic self-excited oscillation) is excited, and the linear generator 300 converts oscillation energy (that is, acoustic energy) E of the sound waves to electric energy. The thermoacoustic generator 500 is intended for use as a solar generator having high-efficiency over waste heat utilization generators and solar panels.

While, researches on coolers, refrigerators and a thermoacoustic refrigerator 600 (for example, see Non-Patent Document 2) illustrated in FIG. 10(b) as device for generating cryogenic temperature have also been actively conducted. The thermoacoustic refrigerator 600 has two loop pipes 100, 120 and a resonance pipe 111. In the loop pipe 100, a regenerator 210, a heater 220 and a cooler 230 forming a motor 200 are provided. In the loop pipe 120, a refrigerating regenerator 410, a cold air discharger 420 and a refrigerating cooler 430 forming a refrigerator 400 are provided. In the thermoacoustic refrigerator 600, when a temperature gradient is given to the regenerator 210 installed in one loop pipe 100, the self-exerted oscillation is excited. Acoustic energy E by the self-excited oscillation is transmitted to the other loop pipe 120 via the resonance pipe 111. The refrigerating regenerator 410 works for refrigeration by executing the reverse Stirling cycle. The thermoacoustic refrigerator 600 which generates a low temperature with the self-excited oscillation as such in-pipe sound waves has a potential over pulse pipe refrigerators.

Many companies conduct researches on the typical thermoacoustic engines above in view of neat recovery and next-generation energy utilization. However, since a full-scale study has been conducted in the 21st century for this new field, a fundamental technology has not yet been established.

An operation temperature of the thermoacoustic engines is around 500 degrees C. for general use (see Non-Patent Document 3). This temperature is much higher than a waste heat temperature (around 100 degrees C. to 300 degrees C.) discharged from actual cars or factories. Therefore, as an attempt to lower the operation temperature of the thermoacoustic engines, in recent years, a "multistage thermoacoustic engine" by arranging regenerators in series in a multistage is proposed, by which power amplification of working flow W is realized in each regenerator (see Non-Patent Document 4).

PRIOR ART DOCUMENTS

Patent Documents

Patent Document 1: JP 2006-118728 A
Patent Document 2: JP 2009-74734 A

NON-PATENT DOCUMENTS

Non-Patent Document 1: S. Backhaus, E. Tward and M. Petach, Appl. Phys. Lett., Vol. 85, No. 6, pp. 1085-1087 (2004), FIG. 4

Non-Patent Document 2: M. Miwa, T. Sumi, T. Biwa, Y. Ueda and T. Yazaki, Ultrasonics, 44, e1527-e1529 (2006), FIG. 5

Non-Patent Document 3: D. L. Gardner, G. W. Swift, J. Acoust. Soc. Am., 114, pp. 1905-1919 (2003)

Non-Patent Document 4: T. Biwa, Appl. Phys. Lett., Vol. 97, 034102 (2010)

SUMMARY OF THE INVENTION

Problems to be Solved by the Invention

However, since the multistage thermoacoustic engine has a property of "using a plurality of regenerators" and the regenerators are arranged dispersively to an acoustic impedance distribution, thermal efficiency is as low as 10% or less. Further, realization with high efficiency at an operation temperature in a high temperature region about 700 degrees C. has been confirmed. However, the waste heat discharged from industrial facilities has generally a low temperature as 300 degrees C. or less. Thus, a thermoacoustic engine having more than 10% thermal efficiency using a neat source temperature such as industrial waste heat does not exist at this stage.

Therefore, development of a thermoacoustic engine which can achieve high thermal efficiency in a low temperature region has been desired. If a structure of the thermoacoustic engine having thermal efficiency over 30% in an industrial waste heat temperature around 300 degrees C. were to be found, a thermoacoustic energy recovery system having high efficiency could be realized, which is inexpensive, is maintenance-free, and is easily produced in large quantities. By realizing the thermoacoustic engine like this, a ripple effect on environment and economic energy saving is significant. Therefore, it is conceivable that the thermoacoustic engine as important device for the next-generation spreads rapidly to the public.

The invention has been made under such circumstances, and it is an object of the invention to provide a thermoacoustic engine which can operate in a low temperature and has high thermal efficiency.

Means to Solve the Problems

The inventors have studied on the following matters regarding thermoacoustic engines.

Since a traveling wave type thermoacoustic engine converts energy by isothermal heat exchange reversibly, Carnot efficiency can be expected ideally. However, external inputs or feedback of sound waves are required for achieving the conversion above. In 1998, Yazaki et al. demonstrated a first practical traveling wave type engine by installing a regenerator in a loop of torus type to feedback sound waves (T. Yazaki et.al., Phys. Rev. Lett. 81, pp. 3128-3131, 1988). However, since the stacked position has low acoustic impedance (ratio of pressure and flow velocity), viscous dissipation and a dream pipe effect is much. The dream pipe effect means the following. When a fluid in a container having a temperature gradient is oscillated forcibly by an external piston or the like, a great amount of heat flow is generated from a high temperature section to a low temperature section. An effective heat transport amount reaches up to more than 1000 times when compared with a case without the oscillation. As a result, heat transport more than metal heat conductivity can be realized only by oscillating the fluid. However, in case of using the thermoacoustic engine as engine, since the heat transport to the low temperature side leads to reduced efficiency, the dream pipe effect is a major factor of efficiency reduction of the thermoacoustic engine.

While, in 2000, Backhaus and Swift proposed a thermoacoustic engine with a branch resonance pipe in a loop (S. Backhaus and G. W. Swift, J. Acoust. Soc. Am. 107, 6, pp. 3148-3166, 2000). The thermoacoustic engine proposed by Backhaus et al. can convert energy using traveling waves in a loop structure, and simultaneously can realize resonance by ¼ wavelength with the branch resonance pipe and high acoustic impedance at a regenerator position. Therefore, the viscous dissipation in the regenerator and the dream pipe effect is so less so that high thermal efficiency of 30% which equals to that of a gasoline engine is realized. The efficiency is based on a ratio of an input heat amount and the work flow W which is output to the branch resonance pipe. Since standing waves are dominant in the branch resonance pipe, the viscous dissipation becomes higher, which may lead to efficiency decrease in terms of energy transport. Further, the operation temperature is as high as about 1000 K. Therefore, in order to realize a practical thermoacoustic engine, it is necessary to achieve both the low temperature operation and the high thermal efficiency.

As an attempt to lower the operation temperature, a multistage thermoacoustic engine has been proposed recently, in which regenerators are arranged in series in a multistage. Gardner et al. succeeded to obtain about 1 kW output by amplifying the work flow W generated from a standing wave type engine by a traveling wave type engine installed at a high acoustic impedance position (D. L. Gardner and G. W. Swift, J. Acoust. Soc. Am. 114, pp. 1905-1919, 2003). Biwa et al. realized a critical oscillation temperature ratio of 1.19 by installing five regenerators in a loop heat acoustic engine (T. Biwa et al., Appl. Phys. Lett. 97, 034102, 2010). However, there is a problem in the multistage type which realizes the low temperature oscillation. In other words, as described above, the regenerators are dispersively arranged in a sound field because the multistage type "uses a plurality of regenerators". Therefore, in many cases, regenerators need to be installed at positions other than the high acoustic impedance positions, which generally results in low efficiency in many cases. In order to solve the problem and to realize a thermoacoustic engine which achieves both the low temperature drive and the high efficiency, a structure needs to be realized in which all the regenerators are installed at traveling wave positions having high acoustic impedance even in the multistage type.

As a result of intensive studies, the inventors have found a structure for converting energy by traveling waves having high acoustic impedance at all positions of regenerators in a loop-type multistage thermoacoustic engine. At the same time, the inventors have found a structure for realizing traveling waves having an acoustic impedance value about ρc (ρ: gas density, c: sound velocity) at positions other than the regenerator positions and for decreasing viscous dissipation in a resonance pipe.

In other words, as a device for solving the problems, a thermoacoustic engine of the invention has: a plurality of resonance pipes in which a working gas is enclosed and that are formed in a ring shape as a whole; a plurality of motors that couple the plurality of resonance pipes; and a branch pipe of which one end is connected to communicate with the resonance pipes from an intersection between a start point and an end point of a loop forming the ring shape among the plurality of resonance pipes, where each of the motors has a regenerator that heats and cools the working gas, a heater that is adjacent to one end side of the regenerator to heat one end section of the regenerator, and a cooler that is adjacent to the other end side of the regenerator to discharge heat in the other end section of the regenerator to an outside, a temperature gradient is given between the both end sections of the regenerator to generate self-excited oscillation of the working gas, a channel cross-sectional area of the resonance pipe that is coupled to each heater is expanded by the same amplification factor of a work flow based on the self-excited oscillation or by an amplification factor within a range of ±30% of the amplification factor of the work flow to a channel cross-sectional area of a resonance pipe that is coupled to the cooler of the motor having the heater, and a channel cross-sectional area of the regenerator is set by 4 to 36 times of the channel cross-sectional area of the resonance pipe that is coupled to the cooler of the motor having the regenerator.

According to the structure, the heater heats the one end section of the regenerator and the cooler cools the other end section of the regenerator. This generates a temperature difference, that is, a temperature gradient between the both end sections of the regenerator. A working flow W is generated by self-excited oscillation (pressure oscillation) of mainly the working gas due to the temperature difference.

A channel cross-sectional area of the resonance pipe that is coupled to the heater to a channel cross-sectional area of a resonance pipe that is coupled to the cooler is expanded by the same amplification factor of a work flow W based on the self-excited oscillation or by an amplification factor within a range of ±30% of the amplification factor of the work flow W. This generates travelling waves having an acoustic impedance value about ρc at positions other than regenerator positions. Further, a channel cross-sectional area of the regenerator is set by 4 to 36 times of the channel cross-sectional area of the resonance pipe that is coupled to the cooler. This generates traveling waves having high acoustic impedance at all the regenerator positions.

The thermoacoustic engine according to the invention further has a generator that is connected to the other end of the branch pipe to communicate with the branch pipe, and generates electric power in correspondence to the self-excited oscillation that is generated in the working gas. This lets the thermoacoustic engine be used as thermoacoustic generator.

According to the structure, acoustic energy by the self-excited oscillation generated in the working gas is converted to electric energy by the generator. This lets the thermoacoustic engine be used as thermoacoustic generator capable of driving in a low temperature and with high efficiency.

The thermoacoustic engine according to the invention further has a refrigerating loop pipe in a ring shape that is connected to communicate with the other end of the branch pipe, a refrigerating regenerator that is provided in a conduit of the refrigerating loop pipe and cools the working gas, a refrigerating cooler that is provided in the conduit of the refrigerating loop pipe to be adjacent to one end side of the refrigerating regenerator where the self-excited oscillation is transmitted and discharges heat in one end section of the refrigerating regenerator to the outside, and a cold air discharger that is provided in the conduit of the refrigerating loop pipe to be adjacent to the other end side of the refrigerating regenerator and discharges cold air that is generated in the other end section of the refrigerating regenerator to the outside. This lets the thermoacoustic engine be used as thermoacoustic refrigerator.

According to the structure, the one end section of the refrigerating regenerator is cooled by the refrigerating cooler and the acoustic energy by the self-excited oscillation generated in the working gas is transmitted to the refrigerating regenerator. This converts the transmitted acoustic energy to the temperature difference between the one end section of the refrigerating regenerator and the other end section of the refrigerating regenerator. The cold air generated in the other end section of the refrigerating regenerator by the temperature difference between the both ends of the refrigerating regenerator is taken out to the outside by the cold air discharger. This lets the thermoacoustic engine be used as thermoacoustic refrigerator capable of driving in a low temperature and with high efficiency.

Effect of the Invention

The thermoacoustic engine according to the invention can convert energy with high efficiency and can drive in a low temperature compared with prior thermoacoustic engines. Further, the plurality of regenerators can be installed at phase positions of the traveling waves. Energy using a plurality of waste heat sources can be recovered by installing the plurality of regenerators.

Further, since the energy conversion with high efficiency is available, the device as a whole can be downsized and a volume of the entire device can be decreased.

Furthermore, in case that the thermoacoustic engine is used as thermoacoustic generator, the thermoacoustic engine of the invention can generate an increased power generation amount compared with the prior thermoacoustic engines. In case that the thermoacoustic engine is used as thermoacoustic refrigerator, the thermoacoustic engine of the invention can drive in a low temperature and with high efficiency compared with the prior thermoacoustic engines.

BRIEF DESCRIPTION OF THE DRAWINGS

FIG. 9A is a graph of a heat flow component of a regenerator in a motor $20c$ in the above numerical calculation model;

FIG. 9B is a graph of a heat flow component of a regenerator in a motor $20d$ in the above numerical calculation model;

EMBODIMENTS FOR CARRYING OUT THE INVENTION

With reference to drawings, embodiments of the invention will be explained in detail. Sizes and positional relations of members in each drawing may be exaggerated for making explanations clearer. In the explanations below, the same names and the same numerals refer to the same or similar members principally and detailed explanations thereof will be omitted on occasion.

<Thermoacoustic Engine>

Figure 1:
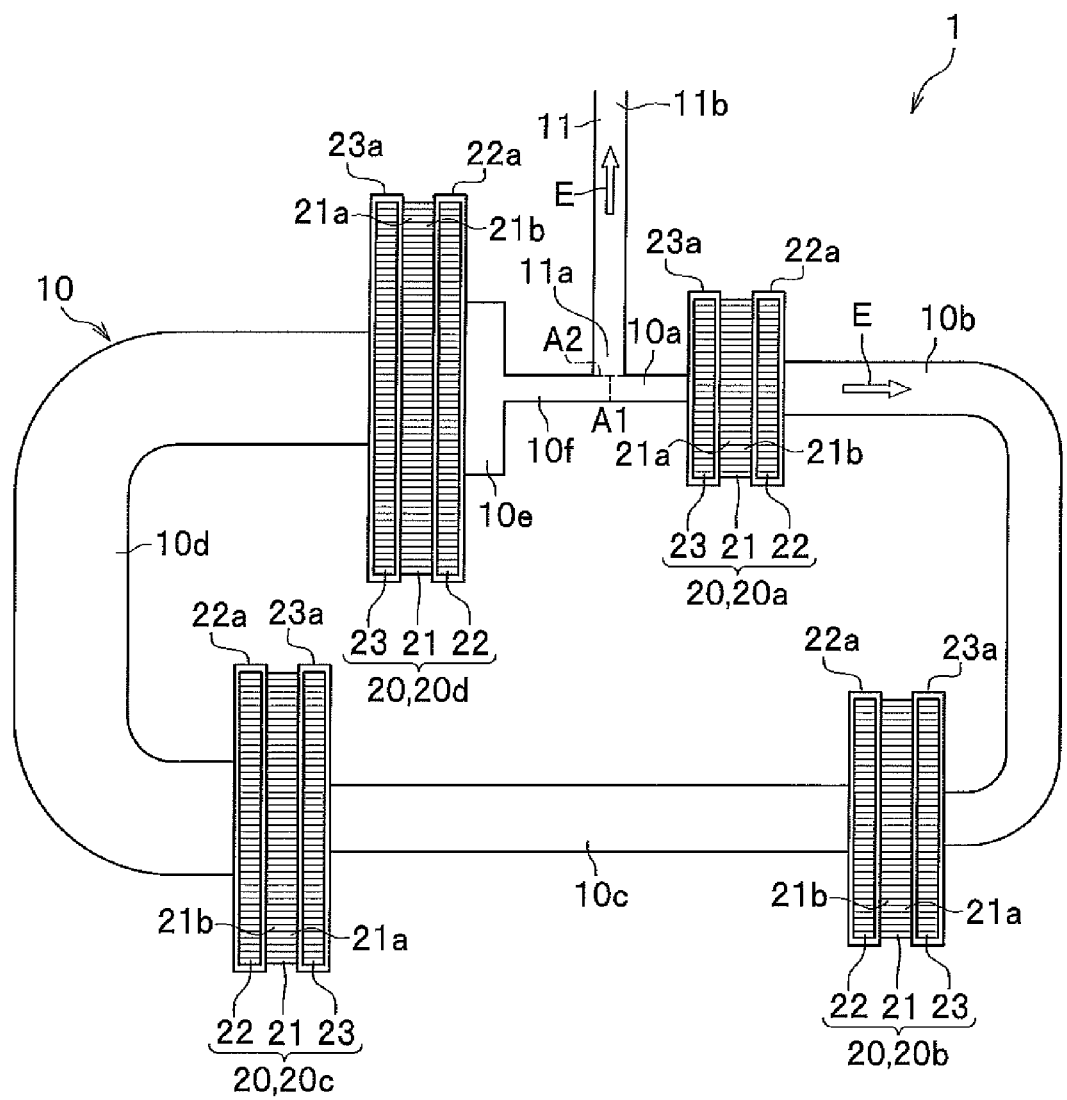
FIG. 1 is a schematic diagram illustrating a structure of a thermoacoustic engine according to the invention.

As illustrated in FIG. 1, a thermoacoustic engine 1 has a plurality of resonance pipes $10a$ to $10f$ in each of which a working gas is enclosed and which are formed in a ring shape as a whole, a plurality of motors 20 ($20a$ to $20d$) which couple the plurality of resonance pipes $10a$ to $10f$, and a branch pipe (branch resonance pipe) 11 of which one end is connected to an intersection between a start point and an end point of a loop forming a ring shape for communicating with the resonance pipe 10 among the plurality of resonance pipes $10a$ to $10f$.

Each structure will be explained below.

[Resonance Pipe]

The resonance pipes $10a$ to $10f$ are filled with the working gas and are formed in an annular shape as a whole. Six resonance pipes $10a$ to $10f$ are provided to form a ring shape connected by the motors 20, and thereby a ring-shaped resonance pipe 10 is formed. Shortly, the resonance pipe $10b$ is arranged at a right side in FIG. 1 and an upper portion and a lower portion thereof are bent, and the resonance pipe $10d$ is arranged at a left side in FIG. 1 and an upper portion and a lower portion thereof are bent. Further, the resonance pipes 10a, 10c, 10e and 10f are straight pipes. In FIG. 1, the resonance pipe 10a is provided at the right side and the resonance pipe 10f is provided at the left side with respect to a broken line (code A1) in FIG. 1. A boundary between the resonance pipe 10a and. the resonance pipe 10f is not strictly delimited. For example, the broken line of the code A1 may be shifted slightly to the right side or the left side in FIG. 1. A conduit including the resonance pipes 10a. to 10f as a whole is formed in a rectangle with rounded corners to be in an annular shape with these resonance pipes 10a to 10f.

A plurality of resonance pipes 10 formed in a ring shape have the start point and the end point (a portion at a broken line of the code A1 (a point 0 in FIG. 4)) of the ring (loop) having the same (identical) pressure amplitude. The portion is provided in the conduit of the resonance pipe 10a where a channel cross-sectional area is minimum among the resonance pipes 10 connected to coolers 23. Shortly, in this case, a connection portion between the resonance pipe 10a and the resonance pipe 10f is set as the start point and the end point. The start point and the end point are the same point (i.e. intersection) and are set as the start point and the end point when an acoustic impedance value is set as ρc in a numerical value simulation in an embodiment described later. A "conduit of the resonance pipe 10a" means to include a resonance pipe (here, the resonance pipe 10f) which communicates with the resonance pipe 10a, in addition to the resonance pipe 10a itself.

The start point and the end point have the same pressure amplitude as the resonance pipe 10a by changing and adjusting channel cross sectional areas and lengths of the resonance pipes 10e and 10f.

The branch pipe 11 is connected divergingly to communicate with the point (i.e. the intersection) of the start point and the end point in the resonance pipe 10.

[Branch Pipe]

The branch pipe 11 has a straight shape and is filled with the working gas. One end 11a thereof communicates with a portion of the resonance pipe 10, that is, a connection portion between the resonance pipe 10a and the resonance pipe 10f. Shortly, the branch pipe 11 is connected to the resonance pipe 10 such that the working gas can flow therebetween. In other words, the branch pipe 11 communicates with the resonance pipe 10 at the point (intersection) between the start point and the end point of the loop formed in a ring shape and branches off from the point in the plurality of resonance pipes 10a to 10f. The phrase of "branches off from the point of the start point and the end point" means that the start point and the end point are included on an extension line of the branch pipe 11 at the connection portion between the branch pipe 11 and the resonance pipe 10. With reference to a broken line (code A2) in FIG. 1, the branch pipe 11 is provided at an upper side and the resonance pipes 10 (10f, 10a) is provided at a lower side. A boundary between the branch pipe 11 and the resonance pipe 10 is not strictly delimited, and, for example, the broken line of the code A2 may position slightly upward in FIG. 1.

Nitrogen, helium, argon, a mixture of helium and argon, air or the like is often used as working gas.

[Motor]

The motors 20 couple the plurality of resonance pipes 10a to 10f. The phrase of "the motors couple the resonance pipes" refers to a state in which the resonance pipes are connected via the motors such that the filled working gas can flow therethrough. In this case, the four motors 20a to 20d are coupled to the resonance pipes 10a to 10e and the resonance pipe 10f is coupled to the resonance pipes 10e and 10a. Therefore, the resonance pipes 10a to 10e are coupled by the motors 20a to 20d as the integral ring-shaped resonance pipe 10.

The motors 20 (20a to 20d) function as self-excited oscillation generating device of the thermoacoustic engine 1, and are provided in the conduit of the resonance pipe 10. Each motor 20 has a regenerator 21 which is provided in the conduit of the resonance pipe 10, a heater 22 and a cooler 23 which are provided to sandwich both ends of the regenerator 21. The heater 22 is arranged on one end side of the regenerator 21 and the cooler 23 is arranged on the opposite side, that is, on the other end side of the regenerator 21. The position of each motor 20 is not especially limited, if the work flow W by self-excited oscillation is transmitted to the other end 11b of the branch pipe 11 as acoustic energy E.

Regarding a structure of the motors 20, the motor 20a will be explained, but other motors 20b to 20d can be explained in the same manner.

(Regenerator)

The regenerator (motor regenerator) 21 is provided in the conduit of the resonance pipe 10, and heats and cools the working gas.

The regenerator 21 induces self-excited oscillation of the working gas by forming a temperature gradient between both end portions of the regenerator 21 using the heater 22 and the cooler 23. Shortly, the regenerator 21 keeps a temperature difference generated between one end section (hereinafter, referred to as a high-temperature section 21b on occasion) and the other end section (hereinafter, referred to as a normal temperature section (motor side normal temperature section) 21a on occasion). Thereby, the regenerator 21 has a function to generate the work flow W mainly by the self-excited oscillation (pressure oscillation) of the working gas. The regenerator 21 can have a structure such as a ceramic honeycomb structure having a number of parallel paths in an extending direction (conduit direction) of the resonance pipe 10 or a laminated structure in which a number of stainless steel mesh plates are laminated at fine pitch. Further, non-woven fibers or the like made of metal fiber may be used.

(Heater)

The heater 22 is provided in the conduit of the resonance pipe 10 to be adjacent to one end side of the regenerator 21 and heats the one end section (high temperature section 21b) of the regenerator 21. Shortly, the heater 22 functions as heat input section for heating one end of the regenerator 21 to be connected with an external heat source. The heater 22 is formed by, for example, a heating heat exchanger. More specifically, for example, the heater 22 has a structure in which a number of metal plates such as mesh plates are laminated at fine pitch. A heating device (not illustrated) is connected to the heater 22 and executes heat treatment via an annular member 22a provided on an outer periphery thereof. For convenience, though a left wall of the annular member 22a is illustrated between the regenerator 21 and the heater 22 in FIG. 1, the heater 22 is adjacent to, i.e. closely contacts with the one end side of the regenerator 21 via the left wall.

(Cooler)

The cooler 23 is provided in the conduit of the resonance pipe 10 to be adjacent to the other end side of the regenerator 21 and discharges heat at the other end section (normal temperature section 21a) of the regenerator 21 to an outside. Shortly, the cooler 23 has a cooling function to discharge the heat at the other end of the regenerator 21 to the outside using cooling water, air, or the like. The cooler 23 is formed by, for example, a cooling heat exchanger. The cooler 23 basically has the structure as the heater 22 and in which a number of metal plates such as mesh plates are laminated at fine pitch. The cooler 23 has a cooling bracket 23a thereof. A cooling channel (not illustrated) is connected to the cooling bracket 23a, and the cooling water flowing in the cooling channel allows the cooler 23 to maintain a constant cooling temperature via the cooling bracket 23a. For convenience, though a right wall of the cooling bracket 23a is illustrated between the regenerator 21 and the cooler 23 in FIG. 1, the cooler 23 is adjacent to, i.e. closely contacts to the other end side of the regenerator 21 via the right wall.

The invention specifies the channel cross-sectional areas of the resonance pipe and the regenerator, and a relation between the channel cross-sectional area of the resonance pipe and the channel cross-sectional area of the regenerator. Reasons for specifying them will be explained below.

Spatial viscous dissipation in the resonance pipe is much in a sound field of standing waves and is less in a sound field of traveling waves. Therefore, setting the resonance pipe in the sound field of traveling waves has an advantage in terms of energy transport. In the invention, the acoustic impedance value at the start point (point at 0 in FIG. 4) is set about $\rho c$ and a section of the resonance pipe 10a is set in the sound field of traveling waves to "realize traveling waves having high acoustic impedance at all the regenerator positions" and at the same time to "realize traveling waves having an acoustic impedance value about $\rho c$ at positions other than the regenerator positions".

Here, $\rho$ is a working gas density, c is sound velocity, and $\rho c$ is constant as a physical value. For example, in case of air (300 K) at 0.1 MPa, $\rho c$ is about 403.3 Ns/m$^3$, in case of air (300 K) at 3.0 MPa, $\rho c$ is about 12098.1 Ns/m$^3$, in case of helium (300 K) at 0.1 MPa, $\rho c$ is about 163.6 Ns/m$^3$, and in case of argon (300 K) at 0.1 MPa, $\rho c$ is about 517.0 Ns/m$^3$. The phrase of "about $\rho c$" indicates that the acoustic impedance value may be within a range of, for example, about ±30%, in addition to a case where the acoustic impedance value is the same as $\rho c$. Shortly, the acoustic impedance value is within the range of ±30% to the above-described $\rho c$ value and is preferably within the range of ±15%.

While, since traveling waves having about $\rho c$ have large flow velocity amplitude to pressure amplitude in the regenerator, the viscous dissipation and the pipe dream effect becomes much and high energy conversion efficiency is hard to be realized. In order to achieve high energy conversion efficiency, traveling waves having high acoustic impedance are required. By expanding the channel cross-sectional area in the regenerator locally, the flow velocity amplitude can be made smaller without changing the pressure amplitude greatly and the high acoustic impedance can be realized.

In the invention, energy conversion using traveling waves having high acoustic impedance can be realized by expanding the channel cross-sectional area of the regenerator by 4 to 36 times locally to the channel cross-sectional area of the resonance pipe. It is noted that traveling waves having high acoustic impedance are difficult to be maintained spatially. Therefore, by reducing the channel cross-sectional area of the resonance pipe just after the regenerator more than the channel cross-sectional area of the regenerator, the traveling waves having about $\rho c$ are realized again. Further, the channel cross-sectional area of the resonance pipe 10b is expanded by the same amplification factor of the work flow W or by an amplification factor within the range of ±30% thereof to the channel cross-sectional area of the resonance pipe 10a. Therefore, the traveling waves having about $\rho c$ can be realized in the resonance pipe 10b. Likewise, the resonance pipes 10b to 10e and the regenerators 21 in the motors 20b to 20d have the same structures.

The acoustic impedance can be determined by the following expression, using a semiconductor pressure sensor to measure angular frequency $\omega$ ($2\pi f$: f is a frequency), time t and a phase difference $\phi$ (see JP 2011-99606 A).

$$Z=P/U=\{|P|\exp(i\omega t)\}/\{|U|\exp\{i(\omega t+\phi)\}\}$$

where the acoustic impedance is Z, the pressure amplitude of the gas is $P=|P|\exp(i\omega t)$, and the flow velocity amplitude of the sound wave is $U=|U|\exp\{i(\omega t +\phi)\}$.

Shortly, the acoustic impedance is expressed by a ratio of the pressure amplitude (P) of the gas to the flow velocity amplitude (U) of the sound wave, and is formed by a real number part and an imaginary number part.

With the working gas density of $\rho$ and the sound velocity of c, the channel cross-sectional area of the resonance pipe 10 is set such that the acoustic impedance value becomes about $\rho c$. Then, in the resonance pipe 10, the sound field is adjusted to the traveling waves.

Based on the above facts, the thermoacoustic engine of the invention specifies the cross-sectional areas of the resonance pipe and the regenerator and the relation between the channel cross-sectional areas of the resonance pipe and the regenerator as follows.

The channel cross-sectional area of the resonance pipe 10 connected to the heater 22 is expanded by the same amplification factor of the work flow W caused by the self-excited oscillation or by an amplification factor within the range of ±30% thereof to the channel cross-sectional area of the resonance pipe 10 connected to the cooler 23 of the motor 20 having the heater 22.

For example, in the motor 20a, the channel cross-sectional area of the resonance pipe 10b which is connected to the heater 22 of the motor 20a is expanded by the same amplification factor of the work flow W caused by the self-excited oscillation or by the amplification factor within the range of ±30% thereof to the channel cross-sectional area of the resonance pipe 10a which is connected to the cooler 23 of the motor 20a having the regenerator 21. The same applies to the resonance pipes 10b to 10e connected to the motors 20b to 20d.

In other words, each channel cross-sectional area of the plurality of resonance pipes 10 is expanded by the same amplification factor of the work flow W or by the amplification factor within the range of ±30% thereof per resonance pipe 10 as directing toward a traveling direction of the work flow W caused by the self-excited oscillation. The phrase of the "traveling direction of the work flow W" indicates a direction in the order from the resonance pipes 10a, 10b, 10c, 10d, 10e and 10f seguentially.

The phrase of the "channel cross-sectional area of the resonance pipe" indicates a channel cross-sectional area when the resonance pipe is cut perpendicular to a longitudinal direction (channel direction), and indicates an inner diameter area of the pipe, that is, an area where the work flow W flows. The "work flow W" means work based on oscillation of the working gas and energy movement, is mechanical energy transported by the sound waves, and is defined by an expression (6) in an embodiment described later. More specifically, a work flow W value is obtained by multiplying the pressure amplitude by the flow velocity amplitude of a cross-sectional average volume and dividing by 2.

Further, in this case, the phrase of "amplification factor of the work flow W" refers to a temperature ratio "TH/TC" in each regenerator, where a heater temperature is TH and a cooler temperature is TC. For example, in the motor 20a, when the heater temperature is at 600 K and the cooler temperature is at 300 K, the amplification factor of the working flow W is twofold. In this case, the channel cross-sectional area of the resonance pipe 10b is set as double to the channel cross-sectional area of the resonance pipe 10a.

By expanding the channel cross-sectional area of the resonance pipe 10b by the same amplification factor of the work flow W or by the amplification factor within the range of ±30% thereof to the channel cross-sectional area of the resonance pipe 10a, the traveling waves having an acoustic impedance value about ρc can be realized in the resonance pipe 10b. The same applies to the resonance pipes 10c to 10e.

The channel cross-sectional area of the resonance pipe 10b is preferably the same as the amplification factor of the work flow W, but high thermal efficiency can be achieved within the range of ±30% with respect to the amplification factor of the work flow W. Among the range of ±30%, a range about ±20% is preferable and a range about ±10% is more preferable.

In each regenerator, the "amplification factor of the work flow W" having the temperature ratio of "TH/TC" is expected. However, since irreversible energy conversion is actually included, an actual "amplification factor of the work flow W"value becomes less than the "TH/TC". Since an irreversibly energy conversion is considered in a simulation in an embodiment described later, the "amplification factor of the word flow W" has a value less than the "TH/TC". Since the "amplification factor of the work flow W" is an accurate amplification factor in the order of a measured value, a simulation value and the temperature ratio "TH/TC", the amplification factor of the resonance pipe 10b may be set as the same as the actual measured value or the simulation value. In this case, these values are included in the above-mentioned range of "±30%." In the invention, the temperature ratio "TH/TC" is regarded as the "amplification factor of the work flow W" from the viewpoint of convenience.

A measuring method of the work flow W will be explained below (see Tetsushi BIWA: "Introduction to measurement for thermoacoustic engineering beginners", Cryogenics, Vol. 43, pp. 517-526 (2008)).

Shortly, the work flow W is related with $Z_R$ (acoustic impedance real number part) by the following expression.

$$W=(A/2)(Z_R)|U|^2$$

where $Z_R$: an acoustic impedance real number part, A: an in-pipe channel cross-sectional area, U: flow velocity amplitude.

A code of the work flow W given by the above expression represents a flow direction of acoustic power. When the code is positive, the acoustic power flows in a direction of the coordinate axis, and, when the code is negative, it flows in the opposite direction.

Further, the channel cross-sectional area of the regenerator 21 is set by 4 to 36 times of the channel cross-sectional area of the resonance pipe 10 which is coupled to the cooler 23 of the motor 20 having the regenerator 21. It is preferably by 6.5 to 15 times, and more preferably by 7 to 11 times. Within these ranges, practical high thermal efficiency is achieved.

For example, the channel cross-sectional area of the regenerator 21 in the motor 20a is set by 4 to 36 times of the cross-sectional area of the resonance pipe 10a which is connected to the motor 20a. The same applies to the motors 20b to 20d.

Here, the "channel cross-sectional area of the regenerator" is a cross-sectional area of a surface facing the channel cross-sectional area of the resonance pipe and is an area of a region where the work flow W flows.

By setting the channel cross-sectional area of the regenerator to the channel cross-sectional area of the resonance pipe which is connected to the cooler by 4 to 36 times, the traveling waves having high acoustic impedance are realized at all the regenerator positions. In case of less than 4 times or over 36 times, if the channel cross-sectional area of the regenerator is larger than the channel cross-sectional area of the resonance pipe which is connected to the cooler, the acoustic impedance becomes higher in some extent. However, compared with the range between 4 to 36 times, the acoustic impedance is not high and the thermal efficiency lowers, which leads to be impractical. Further, in case of over 36 times, the size of the thermoacoustic engine increases, and poor productivity and inconvenient handling occurs. Therefore, in the invention, the range of 4 to 36 times is specified in consideration of the relative high thermal efficiency, the productivity, the handling and the like.

Further, by changing the channel cross-sectional area and the length of the resonance pipe 10f finally, spatial variation of the real number part and the imaginary number part of the pressure amplitude can be adjusted. Therefore, a boundary condition of "the pressure amplitude at the start point and the end point in the loop is equivalent" in the resonance pipe 10 can be fulfilled.

The thermoacoustic engine of the invention is primarily used as thermoacoustic generator or thermoacoustic refrigerator.

Next, referring to the drawings, a thermoacoustic generator and a thermoacoustic refrigerator by the above-mentioned thermoacoustic engine 1 will be explained as an example using a thermoacoustic engine.

<Thermoacoustic Generator>

Figure 2:
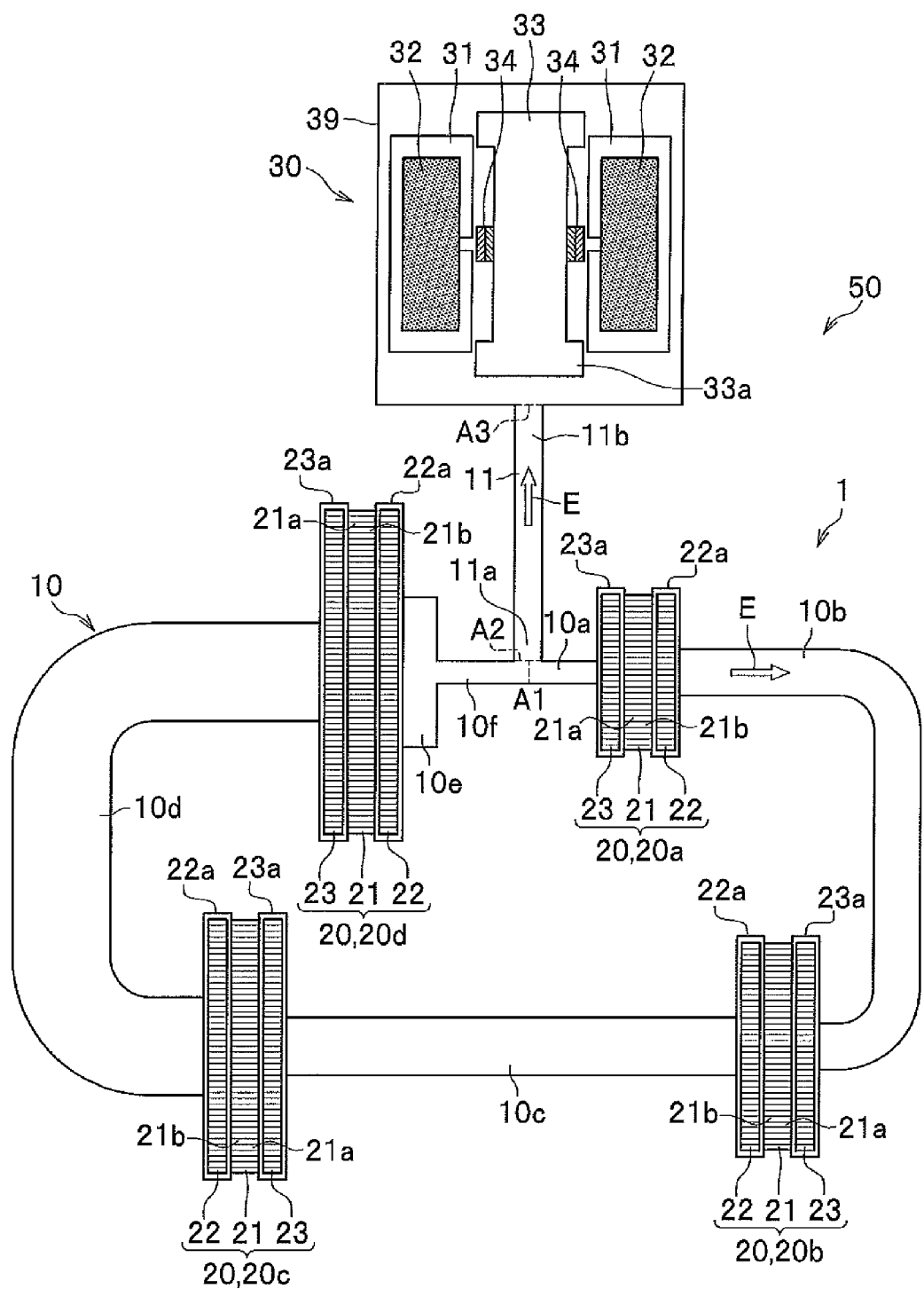
FIG. 2 is a schematic diagram of the thermoacoustic engine according to the invention as thermoacoustic generator.

As illustrated in FIG. 2, a thermoacoustic generator 50 has, in addition to the thermoacoustic engine 1 mentioned above, a generator (linear generators) 30 which is connected to the other end 11b of the branch pipe 11 to communicate with the branch pipe 11 and which generates electricity based on the self-excited oscillation generated in the working gas. The thermoacoustic generator 50 differs from the above-mentioned thermoacoustic generator 1 in that the generator 30 is provided. Since the thermoacoustic engine 1 is explained above, the generator 30 will be explained below.

[Generator]

The generator 30 is connected to the other end 11b of the branch pipe 11 to communicate with the branch pipe 11 and is provided to communicate with a portion (resonance pipes 10f, 10a) of the resonance pipe 10. The generator 30 functions as linear generator which generates electricity based on the self-excited oscillation generated in the working gas. Shortly, an inner yoke 33 oscillatingly reciprocates based on the self-excited oscillation as the acoustic energy E to convert the acoustic energy E to electric energy. Thus, the thermoacoustic generator 50 can be formed, which converts the acoustic energy E transmitted via the branch pipe 11 into the electric energy with the reciprocal movement of the inner yoke 33. The generator 30 is provided at an upper side in FIG. 2 with respect to a broken line (code A3), and the branch pipe 11 is provided at a lower side. A boundary between the branch pipe 11 and the generator 30 is not strictly defined, and the broken line of the code A3 may locate slightly toward at a lower side in FIG. 2.

The generator 30 has a pressure vessel 39 which is connected to the other end 11b of the branch pipe 11 and which receives internal pressure fluctuation corresponding to pressure fluctuation generated inside the resonance pipe 10 and the branch pipe 11. The pressure vessel 39 accommodates outer yokes (cylindrical) 31, 31, coils 32, 32 which are accommodated in the respective outer yokes 31, 31, the inner yoke (cylindrical) 33 positioned between the outer yokes 31, 31, and permanent magnets 34, 34 provided between respective outer yokes 31, 31 and the inner yoke 33. The permanent magnets 34, 34 are formed by a magnet having an N pole and a S pole, respectively.

Such a structure of the generator 30 employs a power generation method based on a principle such that current is generated by time change in magnetic flux density around the coils 32, 32. Shortly, the inner yoke 33 moves based on the self-excited oscillation as the acoustic energy E and the magnetic flux density around the coils 32 and 32 varies greatly, leading to power generation. Further, by attaching a projection 33a on the inner yoke 33, decrease in magnetic flux density due to the magnetic flux passing through an air gap can be avoided.

A linear generation system which converts such straight movements to electricity directly has an advantage by which a conversion loss or a frictional loss due to a conversion mechanism does not exist basically. Therefore, miniaturization of the generator as a whole and high efficiency can be expected. Further, in case of using a free piston type Starling engine which generates stroke fluctuations in reciprocal movements and using tidal energy, oscillation energy or the like for power generation, since oscillation is hard to be converted to rotation, needs for linear generators having high efficiency are increasing.

<Thermoacoustic Refrigerator>

Figure 3:
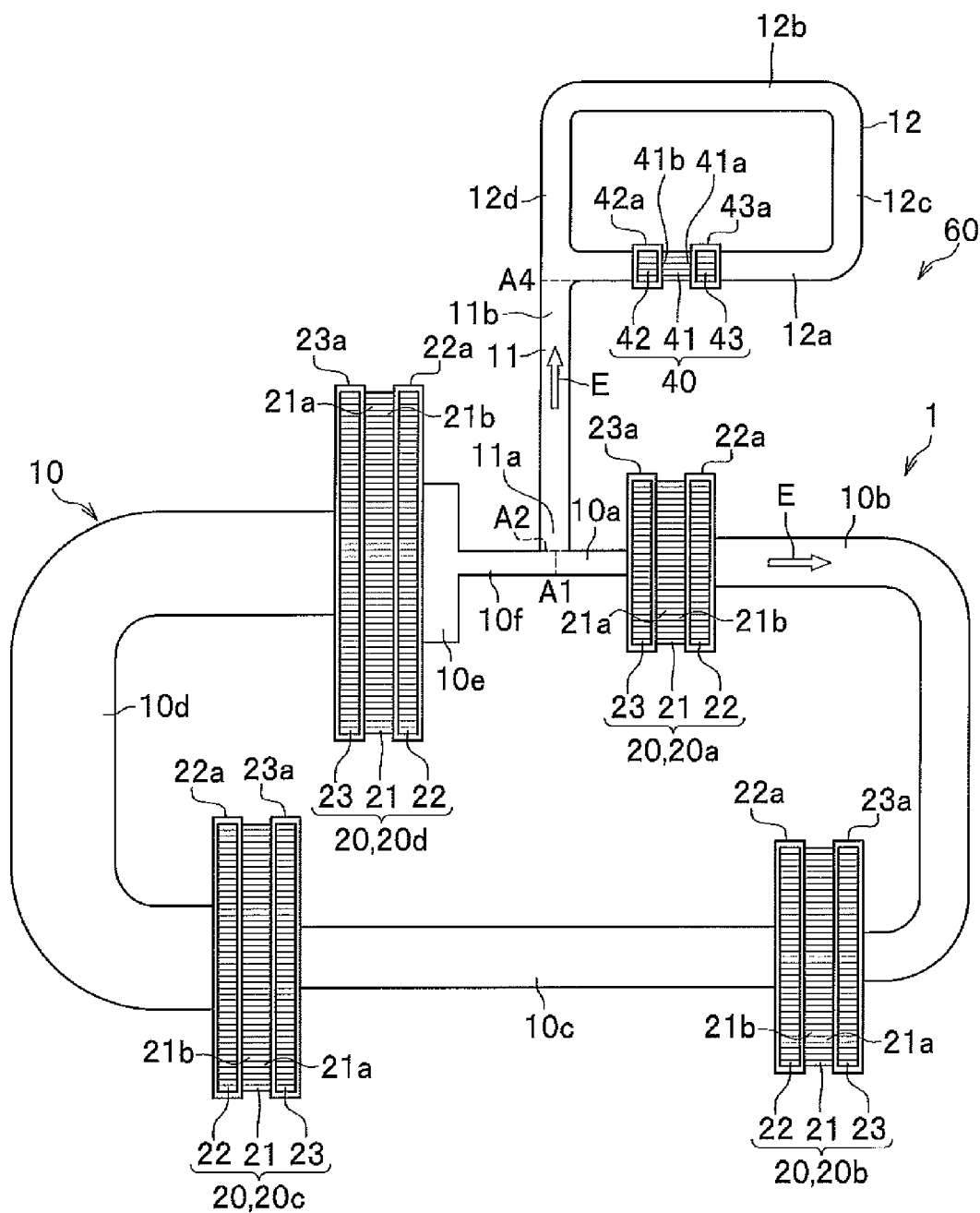
FIG. 3 is a schematic diagram, of the thermoacoustic engine according to the invention as thermoacoustic refrigerator.

As illustrated in FIG. 3, a thermoacoustic refrigerator 60 has, in addition to the thermoacoustic engine 1 described above, a circular-shaped refrigerating loop pipe 12 which is connected to communicate with the other end 11b of the branch pipe 11. A refrigerating regenerator 41, a refrigerating cooler 43 and a cold air discharger 42 as refrigerator 40 are provided in a conduit of the refrigerating loop pipe 12. Except the refrigerator 40 and the refrigerating loop pipe 12, the explanation for the above thermoacoustic engine 1 can be applied to the thermoacoustic refrigerator 60. Therefore, the refrigerator 40 and the refrigerating loop pipe 12 having the refrigerator 40 in the conduit thereof will be explained.

[Refrigerating Loop Pipe]

The ring-shaped refrigerating loop pipe 12 has the working gas therein, is formed as a rectangle having rounded corners, and has straight pipe sections 12a to 12d forming straight portions corresponding to four sides. Shortly, the refrigerating loop pipe 12 has two straight pipe sections 12a, 12b which align substantially parallel to a vertical direction and has two straight pipe sections 12c, 12d which align substantially parallel to a horizontal direction to form straight portions corresponding to the four sides. One end of the straight pipe section 12a is connected to one end of the straight pipe section 12c, one end of the straight pipe section 12b is connected to the other end of the straight pipe section 12c, and the other end of the straight pipe section 12b is connected to one end of the straight pipe section 12d to be bent. Further, the other end of the straight pipe portion 12a is connected to the other end of the straight pipe portion 12d and the other end 11b of the branch pipe 11 is connected to communicate with the refrigerating loop pipe 12 in this portion. The refrigerating loop pipe 12 is provided in an upper side and the branch pipe 11 is provided at a lower side in FIG. 3 with respect to a broken line (code A4). A connection portion between the branch pipe 11 and the refrigerating loop pipe 12 bends towards a right side, but may be formed at a right angle. Further, a boundary between the branch pipe 11 and the refrigerating loop pipe 12 is not strictly defined, and the broken line of the code A4 may be located slightly toward a lower side (for example, the portion that has not been bent).

[Refrigerator]

The refrigerator 40 functions as heat pump device which converts the work flow W caused by the self-excited oscillation of the working gas generated in the motor 20 to cold air (cold heat). The refrigerator 40 has the refrigerating regenerator 41 which is provided in the refrigerating loop pipe 12, the refrigerating cooler 43 and the cold air discharger 42 which are provided to sandwich both ends of the refrigerating regenerator 41. More specifically, in the embodiment, the refrigerator 40 is provided at a side where the branch pipe 11 in the refrigerating loop pipe 12 is connected to, that is, in the conduit of the straight pipe section 12a in the refrigerating loop pipe 12. The refrigerating cooler 43 is arranged at the straight pipe section 12c side of the refrigerating regenerator 41, and the cold air discharger 42 is arranged at the opposite side, that is, at the straight pipe section 12d side of the refrigerating regenerator 41.

(Refrigerating Regenerator)

Refrigerating regenerator 41 is provided in the conduit of the refrigerating loop pipe 12 and cools the working gas.

The self-excited oscillation is transmitted from the motor 20 via the branch pipe 11, the straight pipe sections 12d, 12b, 12c and 12a of the refrigerating loop pipe 12 in that order to one end section (hereinafter, referred to as a normal temperature section (normal temperature section at the refrigerator side) 41a) of the refrigerating regenerator 41. The refrigerating regenerator 41 has a function to convert the transmitted self-excited oscillation to a temperature difference between the one end section (normal temperature section 41a) and the other end section (hereinafter, referred to as a low temperature section 41b as needed) of the refrigerating regenerator 41. Since the normal temperature section 41a of the refrigerating regenerator 41 is cooled by the refrigerating cooler 43, the low temperature section 41b of the refrigerating regenerator 41 is cooled to a temperature lower than the normal temperature section 41a by the transmitted self-excited oscillation and the cold air is generated. The cold air is taken out by the cold air discharger 42 to an outside. The refrigerating regenerator 41 is made of a cold storage material having a large amount of heat capacity. As the cold storage material, for example, stainless steel, copper, lead, or the like can be used and various shapes can be applied therefor.

(Refrigerating Cooler)

The refrigerating cooler 43 is provided in the conduit of the refrigerating loop pipe 12 to be adjacent to the one end side where the self-excited oscillation of the refrigerating regenerator 41 is transmitted. The refrigerating cooler 43 discharges heat at the one end section (normal temperature section 41a) of the refrigerating regenerator 41 to an outside. Shortly, the refrigerating cooler 43 has a cooling function to discharge the heat at the one end of the refrigerating regenerator 41 using cooling water, air or the like to the outside. For example, the refrigerating cooler 43 is formed by a cooling heat exchanger. More specifically, for example, the refrigerating cooler 43 has a structure in which a number of metal plates such as mesh plates are laminated at fine pitch. The refrigerating cooler 43 has a cooling bracket 43a therearound. A cooling channel (not illustrated) is connected to the cooling bracket 43a, and the cooling water flowing in the cooling channel enables the refrigerating cooler 43 to maintain a constant cooling temperature via the cooling bracket 43a. For convenience, though a left wall of the cooling bracket 43a is illustrated between the refrigerating regenerator 41 and the refrigerating cooler 43 in FIG. 3, the refrigerating cooler 43 is adjacent to, i.e. closely contacts to the one end side of the refrigerating regenerator 41 via the left wall.

(Cold Air Discharger)

The cold air discharger 42 is provided in the conduit of the refrigerating loop pipe 12 to be adjacent to the other end side of the refrigerating regenerator 41, and discharges the cold air generated at the other end section (low temperature section 41b) of the refrigerating regenerator 41 to the outside. Shortly, the cold air discharger 42 functions as cold air output section which takes out the cold air generated at the other end of the refrigerating regenerator 41 to the outside. For example, the cold air discharger 42 is formed by a refrigerating heat exchanger. The cold air discharger 42 has the same structure as the refrigerating cooler 43 basically, and, for example, has a structure in which a number of metal plates such as mesh plates are laminated at fine pitch. An annular member 42a made of a high thermal conductivity material (such as copper) through which the cold air (cold heat) is taken out is provided at an outer peripheral position of the cold air discharger 42. For convenience, though a right wall of the annular member 42a is illustrated between the refrigerating regenerator 41 and the cold air discharger 42 in FIG. 3, the cold air discharger 42 is adjacent to, that is, closely contacts with the other end side of the refrigerating regenerator 41 through the right wall.

<Operation of the Thermoacoustic Engine>

The operation of the thermoacoustic engine will be explained with reference to FIGS. 2 and 3, with the above-mentioned thermoacoustic generator and thermoacoustic refrigerator as examples.

[Operation of the Thermoacoustic Generator]

As illustrated in FIG 2, in the motor 20, when the high temperature section 21b of the regenerator 21 is heated by the heater 22 and the normal temperature section 21a of the regenerator 21 is cooled by the cooler 23, a temperature difference occurs between the both ends of the regenerator 21, that is, between the high temperature section 21b and the normal temperature section 21a. The temperature difference generates the work flow W in the motor 20 (especially, the regenerator 21) by the self-excited oscillation of mainly the working gas. The work flow W by the self-excited oscillation generated in the motor 20 is transmitted as the acoustic energy E to the generator 30. For example, in the motor 20a, the work flow W is transmitted via the resonance pipes 10b, 10c, 10d, 10e and 10f and the branch pipe 11 in that order to the generator 30. Likewise, in the motors 20b to 20d, the work flow W by the generated self-excited oscillation is transmitted as the acoustic energy E via the resonance pipe 10 and the branch pipe 11 to the generator 30. By oscillating the inner yoke 33 reciprocatingly based on the self-excited oscillation transmitted to the generator 30, the acoustic energy E is converted to electric energy for power generation.

[Operation of the Thermoacoustic Refrigerator]

As illustrated in FIG. 3, in the same way as to the operation of the above-mentioned thermoacoustic generator, the work flow W is generated by self-excited oscillation of mainly the working gas in the motor 20 (especially, the regenerator 21). The work flow W caused by self-excited oscillation generated in the motor 20 is transmitted as the acoustic energy E via the branch pipe 11 to the refrigerator 40. More specifically, for example, in the motor 20a, the work flow W is transmitted as the acoustic energy E from the high temperature section 21b of the regenerator 21 via the resonance pipes 10b, 10c, 10d, 10e, 10f, the branch pipe 11, the straight pipe sections 12d, 12b, 12c and 12a to the normal temperature section 41a of the refrigerating regenerator 41. Likewise, in the motors 20b to 20d, the work flow W by the generated self-excited oscillation is transmitted as the acoustic energy E via the resonance pipe 10, the branch pipe 11 and the refrigerating loop pipe 12 to the refrigerator 40.

The self-excited oscillation transmitted to the refrigerating regenerator 41 is converted to the temperature difference between the normal temperature section 41a of the refrigerating regenerator 41 which is cooled by discharging heat to the outside by the refrigerating cooler 43 and the low temperature section 41b of the refrigerating regenerator 41. The cold air (cold heat) generated in the low temperature section 41b of the refrigerating regenerator 41 due to the temperature difference between the both ends of the refrigerating regenerator 41 is taken out by the cold air discharger 42 to the outside, and thereby refrigerating capability can be obtained.

EXAMPLE

Next, an embodiment according to the invention will be explained. In the embodiment, a device structure is proposed which "realizes traveling waves having high acoustic impedance at all the regenerator positions" and "realizes traveling waves having an acoustic impedance value about ρc at positions other than the regenerator positions" by an numeric calculation, and an actual performance thereof is verified. Shortly, the device structure is proposed by predetermined calculation expressions described later and data illustrated in FIGS. 5 to 9 are calculated to verify the performance by a simulation using the calculation expressions.

Figure 4:
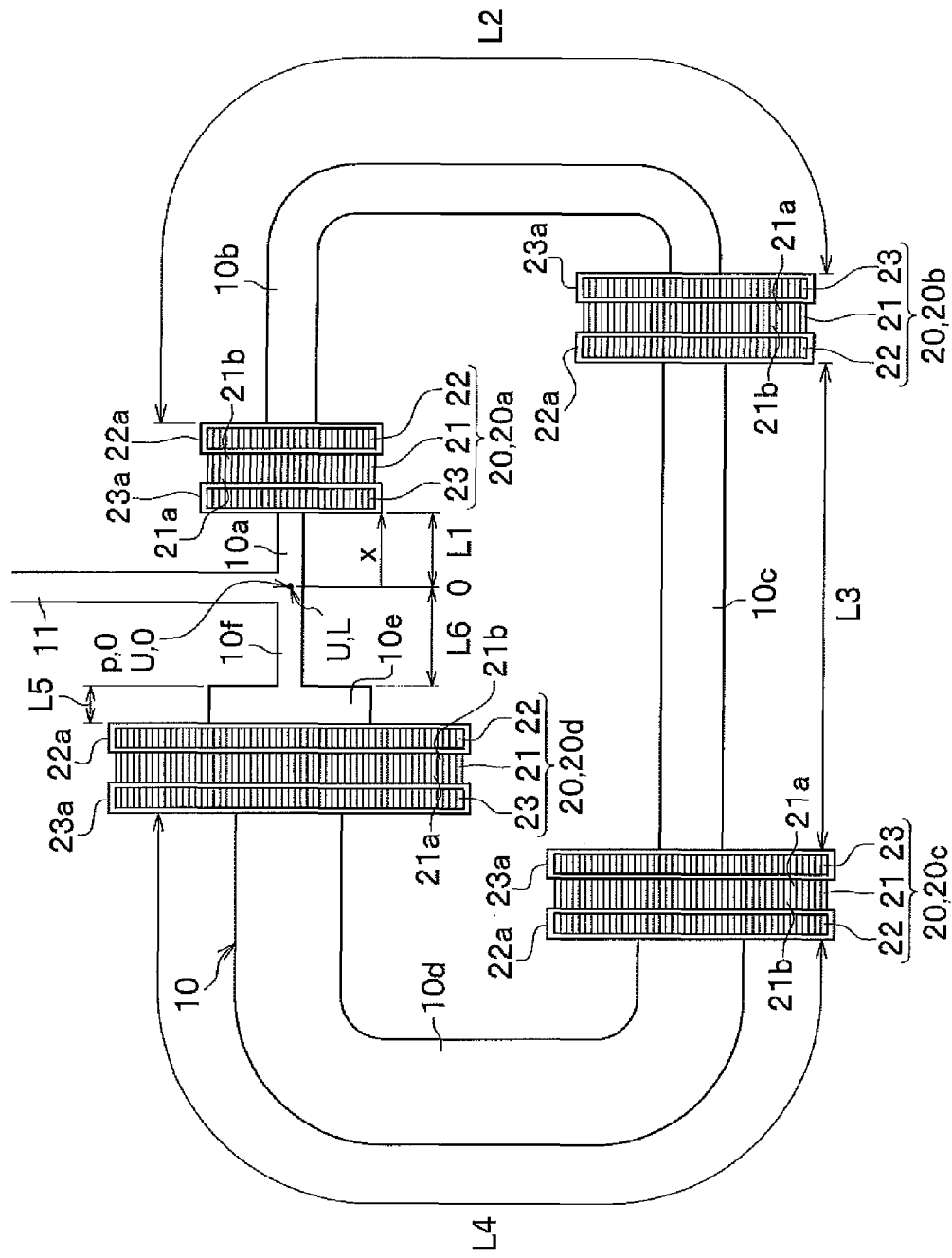
FIG. 4 is a schematic diagram of a numerical calculation model for the thermoacoustic engine of the invention.

FIG. 4 illustrates a numeric calculation model (i.e. a structure of the thermoacoustic engine) used in the embodiment. FIG. 4 illustrates a shape of the thermoacoustic engine schematically to be easily understood.

In this case, a multistage amplification type thermoacoustic engine is used as an example of the calculation model having motors (motors 20a, 20b, 20c, 20d in a clockwise direction from the zero point (0 point)). Each of the motors includes the cooler, the heater and the regenerator, and the motors are provided at four locations in a loop pipe with a branch which is formed by the resonance pipes 10a to 10f and the branch pipe 11. In FIG. 4, L1 to L6 indicate the lengths of the resonance pipes 10a to 10f, respectively.

Installing positions, cross-sectional areas, channel diameters of the regenerators, channel diameters of the resonance pipes and the like are optimized to "realize traveling waves having high acoustic impedance at all regenerator positions" and to "realize traveling waves having an acoustic impedance value about ρc at positions other than the regenerator positions". A table 1 illustrates detailed specifications of each section. In the table 1, Units 1 to 4 refer to the motors 20a to 20d, respectively. A channel diameter in a Unit is presumed such as a mesh diameter. Further, the diameter of the resonance pipe refers to an inner diameter, and the diameter of the Unit refers to an inner diameter, that is, a portion in which the work flow W flows.

TABLE 1

Detailed specifications of each section

|  | Length (m) | Diameter (mm) | Aperture ratio (%) | Channel diameter (mm) |
|---|---|---|---|---|
| Resonance pipe 10a Unit 1 | 0.1 | 40 | 100 | 40 |
| Cooler | 0.04 | 154 | 83.4 | 2.6 |
| Regenerator | 0.02 | 154 | 60 | 0.13 |
| Heater | 0.04 | 154 | 83.4 | 2.6 |
| Resonance pipe 10b Unit 2 | 2.865 | 57 | 100 | 57 |
| Cooler | 0.04 | 218 | 83.4 | 2.6 |
| Regenerator | 0.02 | 218 | 60 | 0.13 |
| Heater | 0.04 | 218 | 83.4 | 2.6 |
| Resonance pipe 10c Unit 3 | 2.865 | 81 | 100 | 81 |
| Cooler | 0.04 | 310 | 83.4 | 2.6 |
| Regenerator | 0.02 | 310 | 60 | 0.13 |
| Heater | 0.04 | 310 | 83.4 | 2.6 |
| Resonance pipe 10d Unit 4 | 2.865 | 114 | 100 | 114 |
| Cooler | 0.04 | 437 | 83.4 | 2.6 |
| Regenerator | 0.02 | 437 | 60 | 0.13 |
| Heater | 0.04 | 437 | 83.4 | 2.6 |
| Resonance pipe 10e | 0.074 | 166 | 100 | 166 |
| Resonance pipe 10f | 0.1 | 40 | 100 | 40 |

Each heater temperature is set at 600 K, each cooler temperature is set at 300 K, and a helium gas (3 MPa) at 300 K is used as working gas. Acoustic impedance is spatially uniform in a pure sound field of traveling waves, and is expressed by a pure real number ρc. Since the working gas used as an example in the embodiment is the helium gas (3 MPa) at 300 K, ρc becomes about 4973.4 Ns/m³.

A calculation method used in the embodiment will be illustrated below. The thermoacoustic engine only needs to have a condition which fulfills the structure of the invention. A detailed condition may be determined by other methods in place of the calculation method described below. The numeric calculation in the embodiment uses a following expression (N. Rott, Z. Angew. Math. Phys. 20, pp. 230-243, 1969.) led by Rott by approximating a momentum expression, or a continuity equation in a linear long wavelength.

[Expression 1]

$$\frac{d}{dx}\begin{bmatrix} p \\ U \end{bmatrix} = \begin{bmatrix} 0 & \frac{-j\omega\rho_m}{A_C(1-\chi_v)} \\ -\frac{j\omega A_C}{p_m}\left\{1 - \frac{\gamma-1}{\gamma}(1-\chi_v)\right\} & \frac{\chi_a - \chi_v}{(1-\chi_v)(1-\sigma)}\frac{1}{T_m}\frac{dT_m}{dx} \end{bmatrix}\begin{bmatrix} p \\ U \end{bmatrix}$$

$$= A\begin{bmatrix} p \\ U \end{bmatrix} \quad (1)$$

Here, p: pressure amplitude, U: flow velocity amplitude of a cross-sectional average volume, j: imaginary number, ω: angular frequency, $\rho_m$: mean density, $A_c$: cross-sectional area, $p_m$: mean pressure, γ: specific heat ratio, σ: Prandtl number, $T_m$: mean temperature, $\chi_a$, $\chi_v$: complex functions depending on a temperature diffusion coefficient, a dynamic viscosity coefficient are set. When an eigenvalue and an eigenvector in a matrix A in the expression 1 are determined and the matrix A is diagonalized, a following expression is obtained, by which information of continuous point X can be obtained using p (0) and U (0) in X=0.

[Expression 2]

$$\begin{bmatrix} p(x) \\ U(x) \end{bmatrix} = B\begin{bmatrix} p(0) \\ U(0) \end{bmatrix} \quad (2)$$

$$B_{11} = \frac{(-\lambda_2 e^{\lambda_1 x} + \lambda_1 e^{\lambda_2 x})}{\sqrt{A_{22}^2 + 4A_{12}A_{21}}}, B_{12} = \frac{A_{12}(e^{\lambda_1 x} - e^{\lambda_2 x})}{\sqrt{A_{22}^2 + 4A_{12}A_{21}}},$$

$$B_{21} = \frac{A_{21}(e^{\lambda_1 x} - e^{\lambda_2 x})}{\sqrt{A_{22}^2 + 4A_{12}A_{21}}}, B_{22} = \frac{(\lambda_1 e^{\lambda_1 x} - \lambda_2 e^{\lambda_2 x})}{\sqrt{A_{22}^2 + 4A_{12}A_{21}}},$$

$$\lambda_{1,2} = \frac{A_{22} \pm \sqrt{A_{22}^2 + 4A_{12}A_{21}}}{2}.$$

When the expression (2) is coupled per continuous space from the zero point in FIG. 4 in a clockwise direction and the boundary condition of "the pressure amplitude at the start point and the end point of the loop is the same" is used, a transfer matrix is as follows.

[Expression 3]

$$\begin{bmatrix} p(x_n) \\ U(x_n) \end{bmatrix} = B_n \ldots B_2 B_1 \begin{bmatrix} p(0) \\ U(0) \end{bmatrix} = C\begin{bmatrix} p(0) \\ U(0) \end{bmatrix} \quad (3)$$

Here, the temperature gradient of each regenerator is determined using a condition such that "an enthalpy flow H is constant in the regenerator". Based on the expression (3), impedance at the start point can be expressed by a following expression.

[Expression 4]

$$\frac{p(0)}{V(0)} = Z(0) = \frac{C_{12}}{1 - C_{11}} \quad (4)$$

An impedance distribution in the loop is determined using the value of the expression (4) as initial value. Quantity of heat Q input to the engine and the work flow W is determined by the following expression.

[Expression 5]

$$Q = H - W = -\frac{1}{2}\text{Re}\left[\frac{\chi_a - \tilde{\chi}_v}{(1+\sigma)(1-\chi_v)}p \cdot \tilde{U}\right] + \quad (5)$$

$$\frac{C_p \rho_m}{A_C 2\omega}\text{Im}\left[\frac{\chi_a - \sigma\chi_v}{|1-\chi_v|^2(1-\sigma^2)}\right]|U|^2\frac{dT_m}{dx}$$

$$W = \frac{1}{2}\text{Re}[p \cdot \tilde{U}] \quad (6)$$

$C_p$ is an isobaric specific heat, and "~" is a complex conjugate. A heat flow by simple heat conduction is ignored in the expression 5 for aiming at a fundamental discussion in the embodiment.

Since the thermoacoustic engine has a loop shape, the start point coincides with the end point. Of course, the pressure amplitude at the start point and at the end point becomes equal when the thermoacoustic engine is driving in an actual machine. For example, in case that the value of the acoustic impedance at the start point is set at ρc in the numerical simulation, the thermoacoustic engine actually drives in the real machine when the pressure amplitude value at the end point becomes equal to the pressure amplitude value at the start point. By changing the diameters and the lengths of the resonance pipes 10e and 10f such that the pressure amplitude value at the end point becomes equal to the pressure amplitude value at the start point, spatial variation of the real number part and the imaginary number part of the pressure amplitude is adjusted. Therefore, the boundary condition of "the pressure amplitude at the start point and the end point is equal" is fulfilled in the numeric simulation. When the boundary condition above is fulfilled in the numeric value simulation, the real machine also drives having the acoustic impedance value of ρc at the start point. In FIG. 4, the diameter is reduced from the resonance pipe 10e to the resonance pipe 10f in one stage so as to have the same diameter as the resonance pipe 10a. However, for example, the resonance pipe 10e may be reduced in a tapered shape to have the same diameter as the resonance pipe 10a.

Figure 5A:
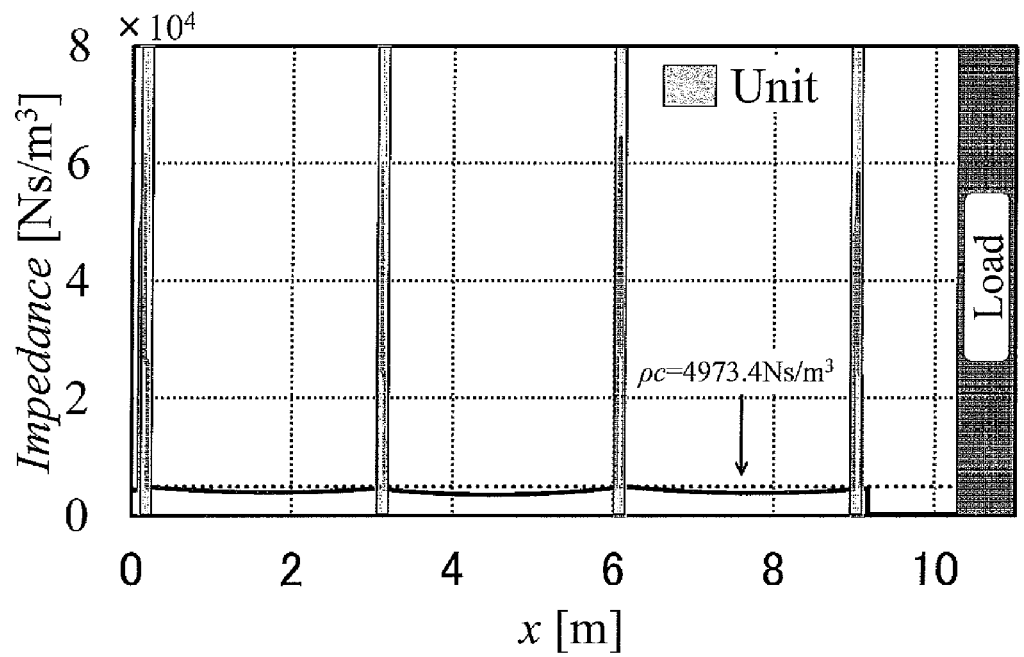
FIG. 5A is a graph of a real number part of impedance illustrating an acoustic impedance distribution in the numerical calculation model for the thermoacoustic engine used in the embodiment.
Figure 5B:
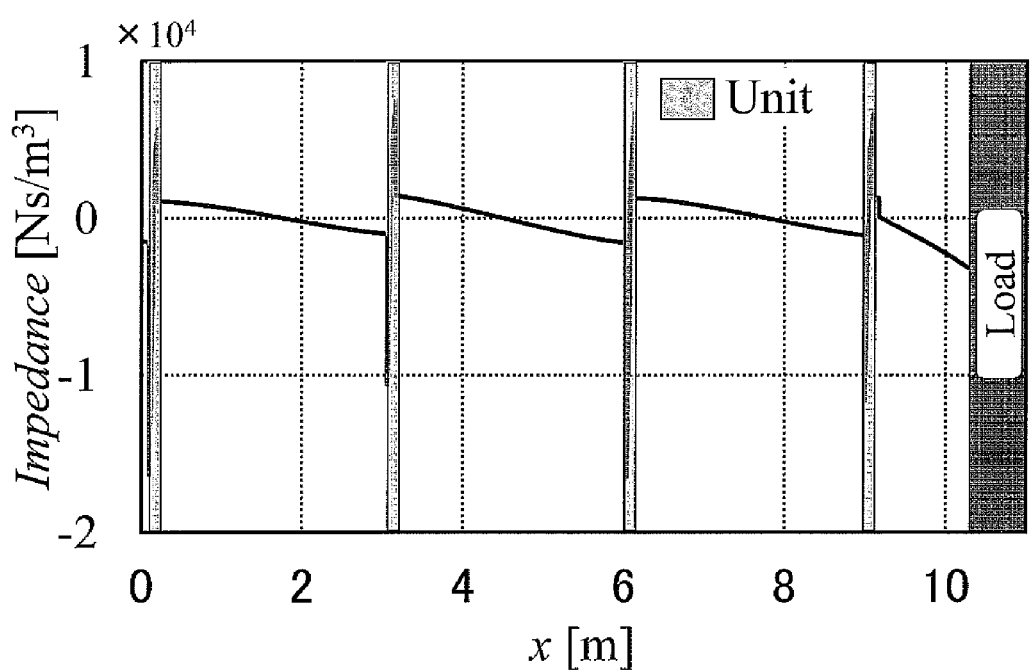
FIG. 5B is a graph of an imaginary number part thereof.
Figure 6:
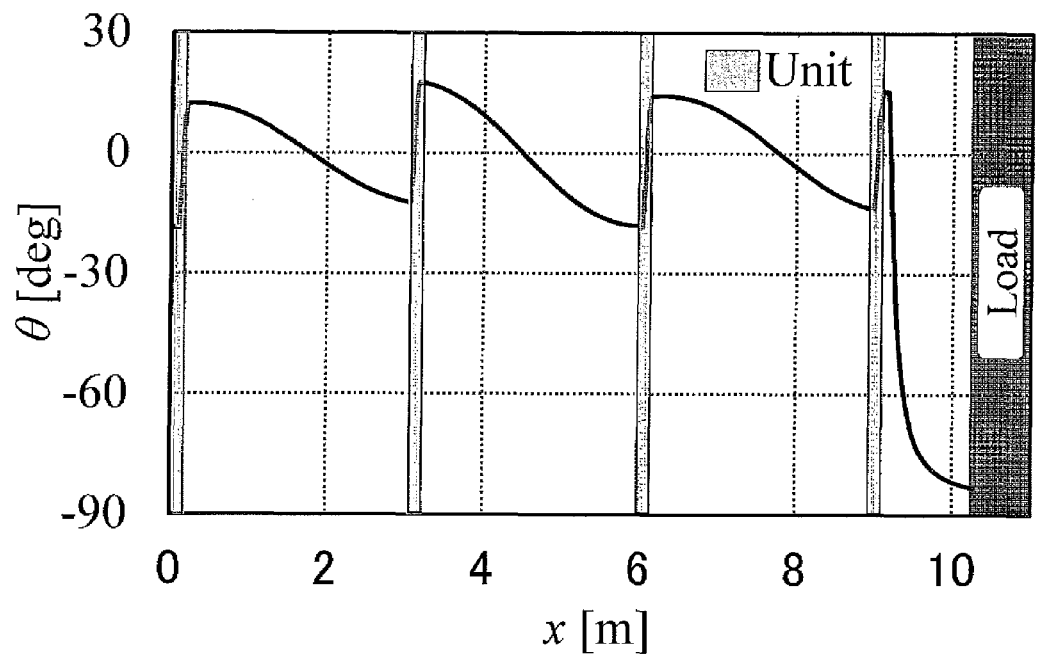
FIG. 6 is a graph illustrating a phase difference between pressure and flow velocity in the numerical calculation model for the thermoacoustic engine used in the embodiment.
Figure 7:
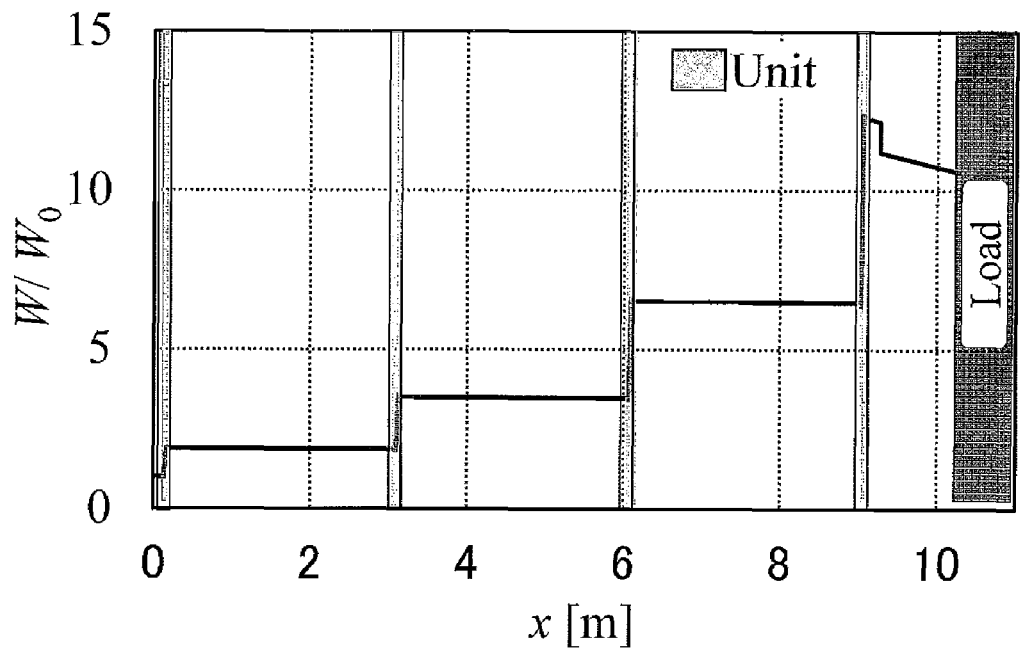
FIG. 7 is a graph illustrating a space distribution of normalized work flow W in the numerical calculation model for the thermoacoustic engine used in the embodiment.

The acoustic impedance distribution is illustrated in FIGS. 5A and 5B, the phase difference between the pressure and the flow velocity is illustrated in FIG. 6, and a work flow W distribution is illustrated in FIG. 7 in the numeric calculation model of the embodiment. A hatching in the drawings indicates a position of each motor (illustrated as Unit in the drawings). FIG. 5A indicates the real number part and FIG. 5b illustrates the imaginary number part. Further, FIG. 7 is a graph in which values are normalized with reference to the start point by dividing a value W of the work flow W at an arbitrary point by a value $W_0$ at the work flow W at a start point.

Based on the result, the acoustic impedance in each resonance pipe 10a to 10e is around 4973.4 Ns/m$^3$ in FIG. 5A, and the imaginary number part in the acoustic impedance of each resonance pipe is approximately zero in FIG. 5B. Further, the phase difference between the pressure and the flow velocity in FIG. 6 is within ±19 degrees over the entire range of the resonance pipes 10a to 10e, and it can be confirmed that the sound field of traveling waves is substantially realized in the proposed structure.

The work flow W in FIG. 7 will be verified. In the embodiment, since each heater temperature $T_H$ is set at 600 K and the cooler temperature $T_C$ is set at 300 K, each regenerator ideally has the "temperature ratio: $T_H/T_C=2$", by which double work flow W amplification is expected. As obvious from FIG. 7, the work flow W amplification factor of each regenerator in the embodiment is 1.91, 1.90, 1.91, 1.91 times, and the amplification factor relatively close to the temperature ratio can be obtained. The final work flow W amplification factor reaches 12.4 times. Further, since the traveling waves about ρc are realized in the resonance pipes, attenuation of the work flow W due to viscous dissipation is very small. Based on the verification described above, "realizing the traveling waves having high acoustic impedance in all the regenerator positions" and at the same time "realizing the traveling waves having an acoustic impedance value about ρc at positions other than the regenerator positions" can be proved by using the proposed structure.

Figure 8A:
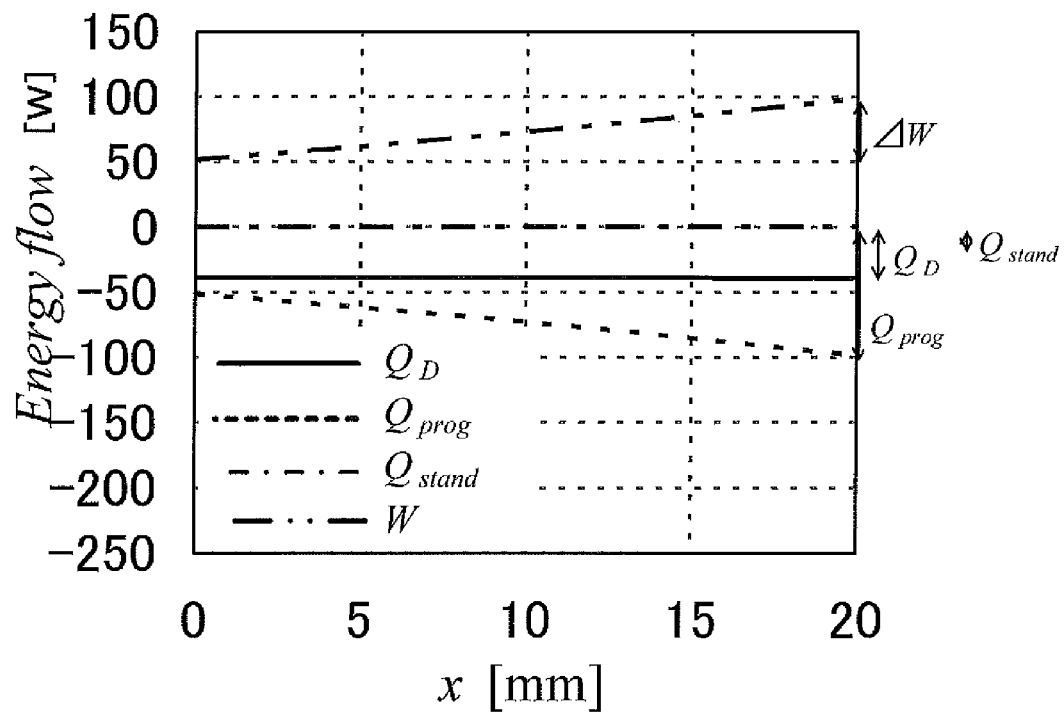
FIG. 8A is a graph of a heat flow component of a regenerator in a motor $20a$ in the numerical calculation model for the heat acoustic engine used in the embodiment.
Figure 8B:
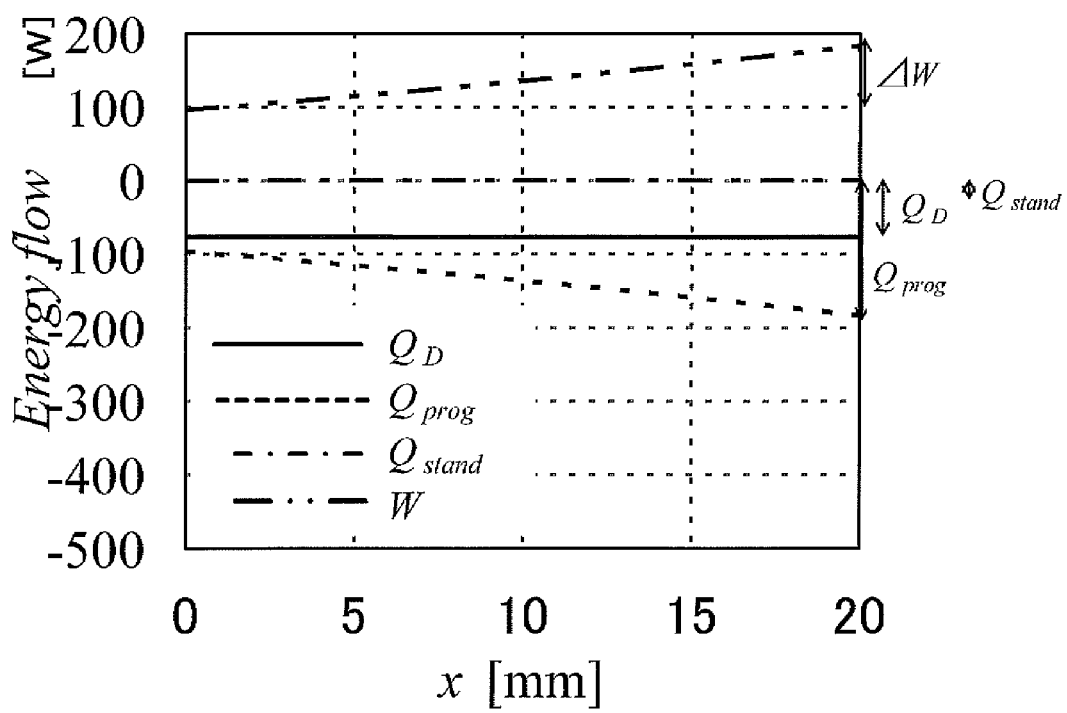
FIG. 8B is a graph of a heat flow component of a regenerator in a motor $20b$ in the above numerical calculation model.
Figure 10A:
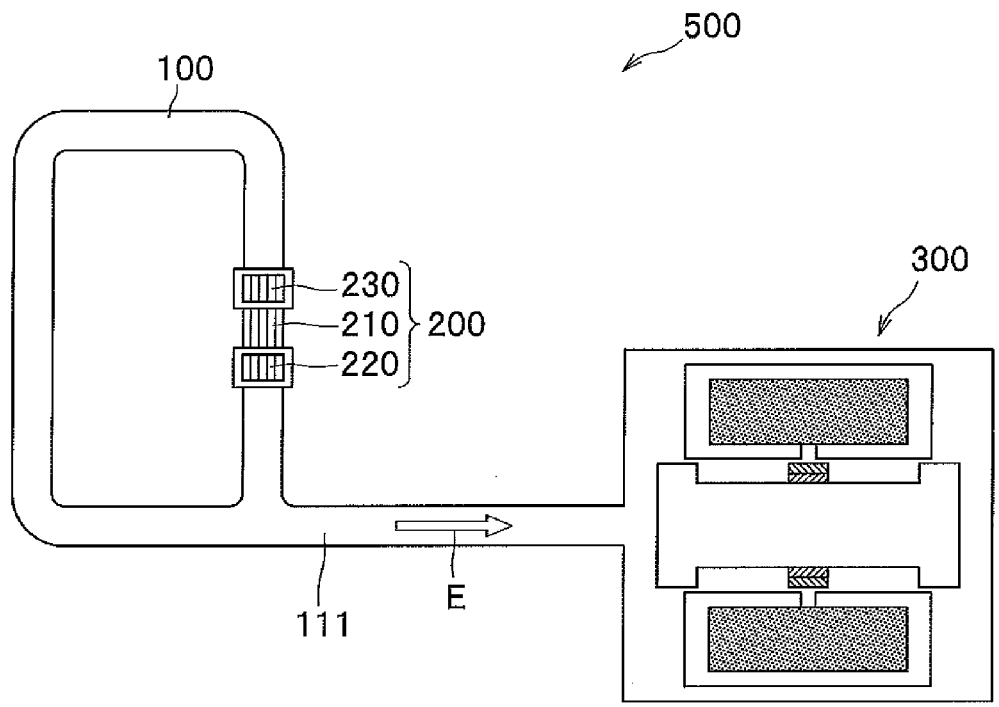
FIG. 10A is a schematic diagram of a thermoacoustic engine used as thermoacoustic generator in a prior art.
Figure 10B:
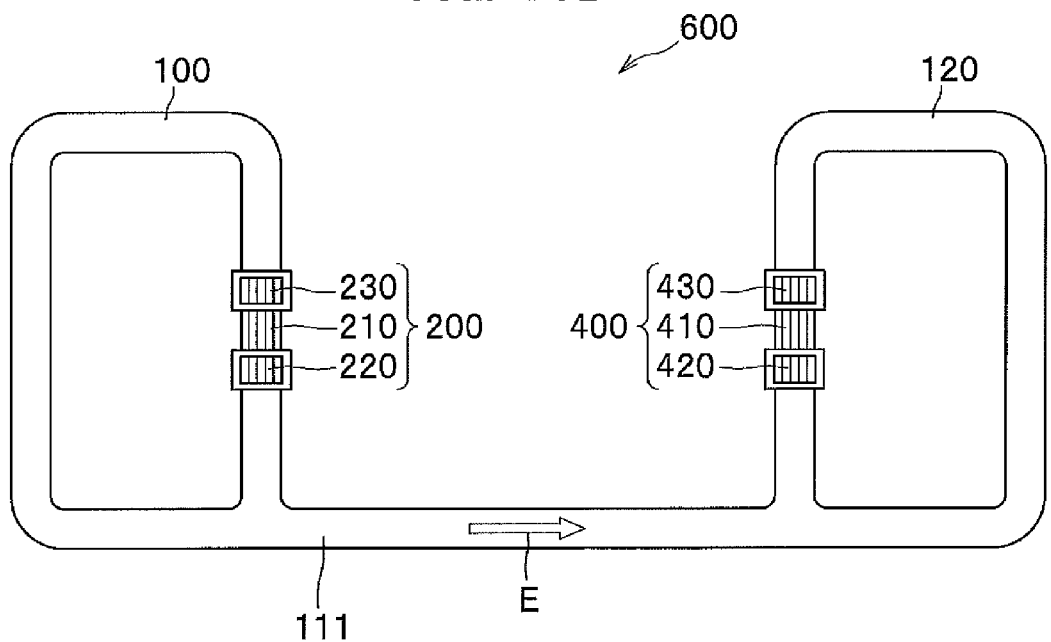
FIG. 10B is a schematic diagram of the thermoacoustic engine used as thermoacoustic refrigerator in the prior art.

The thermal efficiency of the proposed structure under the same condition will be verified. Heat flow components in a regenerator of each motor are illustrated in FIGS 8A to 9B. FIG. 8A illustrates the heat flow components in the regenerator (regenerator 1) of the motor 20a, FIG. 8B illustrates the heat flow components in the regenerator (regenerator 2) of the motor 20b, FIG. 9A illustrates the heat flow components in the regenerator (regenerator 3) of the motor 20c, and FIG. 9B illustrates the heat flow components in the regenerator (regenerator 4) of the motor 20d. In the drawings, W stands for the work flow, $Q_{prog}$ stands for the heat flow by traveling waves, $Q_{stand}$ stands for the heat flow by standing waves, and $Q_D$ stands for the heat flow through a dream pipe effect. A horizontal axis indicates a position of an inside of each regenerator. In the embodiment, since the traveling waves having high acoustic impedance are realized at each regenerator position, the heat flow through the dream pipe effect and the heat flow by the standing waves are very small.

From FIGS. 8A to 9B, the thermal efficiency in each regenerator is, 34.1% in the regenerator 1, 33.6% in the regenerator 2, 34.5% in the regenerator 3, and 33.5% in the regenerator 4. The thermal efficiency of the whole device determined by dividing the heat amount added to all the heaters by the work flow W flowing to a load is 33.8%. This is high efficiency to reach 67.7% of the Carnot efficiency, which realizes efficiency as a gasoline engine at a low temperature heat source about 600 K of the heater temperature.

The thermal efficiency is determined by dividing an amplification amount (ΔW) of the work flow W in the thermoacoustic engine by a total sum ($Q_D+Q_{prog}+Q_{stand}$) of the input heat amount. The $Q_D$, the $Q_{prog}$ and the $Q_{stand}$ are end portion values at a heater side of the regenerator, and are values at the right edge of the graph. Further, ΔW indicates a difference in values between both ends of a regenerator. With these values, the thermal efficiency n can be determined by a following expression.

"thermal efficiency $\eta = \Delta W/(Q_D+Q_{prog}+Q_{stand})$"

As explained above, in the invention, the structure of the multistage thermoacoustic engine is proposed by the numeric calculation, which "realizes the traveling waves having high acoustic impedance at all the regenerator positions" and at the same time "realizes the traveling waves having an acoustic impedance value about ρc at positions other than the regenerator positions". The viscous dissipation and the irreversible energy conversion is extremely small in the proposed structure, and 33.8% of the heat efficiency is realized when the heater temperature is at 600 K. Shortly, high efficiency reaching 67.7% of the Carnot efficiency is obtained.

Thus, the invention is explained in detail by the embodiment and the example, but the contents of the invention is not limited to the description above, and the scope of rights of the invention should be broadly interpreted based on claims. The contents of the invention are widely available for variation, change or the like on the basis of the description above.

For example, the structures of the thermoacoustic generator and the thermoacoustic refrigerator are not limited to the above-mentioned forms, but the structure of the invention can be applied to thermoacoustic generators and thermoacoustic refrigerators having generally used structures. For example, in the thermoacoustic generator, the structure of the generator (linear generator) is not limited to the structure explained above, and any structures may be used as long as the generator is used as thermoacoustic generator.

Further, the shapes of the resonance pipes and the refrigerating loop pipe in a plan view as a whole are set as a rectangle with rounded corners in the above embodiments, but are not limited thereto. For example, the shapes may be a square, a circle or an ellipse. Furthermore, the thermoacoustic engine having four motors is explained above, but the number of motors is arbitrary and 2 to about 20 motors may be installed in the path of the resonance pipe.

Still further, in this case, the resonance pipe which is connected to the branch pipe is formed by the resonance pipe 10*f* and the resonance pipe 10*a*, but they may be an integral single resonance pipe having the same diameter (inner diameter). Similarly, the resonance pipe 10*e* and the resonance pipe 10*f* are separate in the above description, but a single resonance pipe formed integrally may be used.

EXPLANATION OF REFERENCES 1 thermoacoustic engine
10, 10*a* to 10*f* resonance pipe
11 branch pipe
12 refrigerating loop pipe
20, 20*a* to 20*d* motor
21 regenerator
22 heater
23 cooler
30 generator (linear generator)
40 refrigerator
41 refrigerating regenerator
42 cold air discharger
43 refrigerating cooler
50 thermoacoustic generator
60 thermoacoustic refrigerator

The invention claimed is:

1. A thermoacoustic engine comprising:
a plurality of resonance pipes in which a working gas is enclosed and that are formed in a ring shape as a whole;
a plurality of motors that couple the plurality of resonance pipes; and
a branch pipe of which one end is connected to communicate with the resonance pipes from an intersection between a start point and an end point of a loop forming the ring shape among the plurality of resonance pipes,
wherein each of the motors has a regenerator that heats and cools the working gas, a heater that is adjacent to one end side of the regenerator to heat one end section of the regenerator, and a cooler that is adjacent to other end side of the regenerator to discharge heat in other end section of the regenerator to an outside,
a temperature gradient is given between the both end sections of the regenerator to generate self-excited oscillation of the working gas,
a channel cross-sectional area of the resonance pipe that is coupled to each heater is expanded by a same amplification factor of a work flow based on the self-excited oscillation or by an amplification factor within a range of ±30% of the amplification factor of the work flow to a channel cross-sectional area of a resonance pipe that is coupled to the cooler of the motor having the heater, and
a channel cross-sectional area of each regenerator is set to be 4 to 36 times of the channel cross-sectional area of the resonance pipe that is coupled to each cooler of each motor, and
the channel cross-sectional area of the resonance pipe at a boundary between each heater and each resonance pipe connected to each heater is made smaller than a channel cross-sectional area of each regenerator.

2. The thermoacoustic engine according to claim 1 further comprising a generator that is connected to other end of the branch pipe to communicate with the branch pipe, and generates electric power in correspondence to the self-excited oscillation that is generated in the working gas.

3. The thermoacoustic engine according to claim 1 further comprising:
a refrigerating loop pipe in a ring shape that is connected to communicate with the other end of the branch pipe,
a refrigerating regenerator that is provided in a conduit of the refrigerating loop pipe and cools the working gas,
a refrigerating cooler that is provided in the conduit of the refrigerating loop pipe to be adjacent to one end side of the refrigerating regenerator where the self-excited oscillation is transmitted and discharges heat in one end section of the refrigerating regenerator to the outside, and
a cold air discharger that is provided in the conduit of the refrigerating loop pipe to be adjacent to other end side of the refrigerating regenerator and discharges cold air that is generated in other end section of the refrigerating regenerator to the outside.

* * * * *

UNITED STATES PATENT AND TRADEMARK OFFICE
CERTIFICATE OF CORRECTION

PATENT NO. : 9,777,951 B2
APPLICATION NO. : 14/362973
DATED : October 3, 2017
INVENTOR(S) : Hasegawa et al.

It is certified that error appears in the above-identified patent and that said Letters Patent is hereby corrected as shown below:

In the Specification

Column 18, Lines 10-22, Expression 2 should appear as follows:

$$\begin{bmatrix} p(x) \\ U(x) \end{bmatrix} = \mathbf{B} \begin{bmatrix} p(0) \\ U(0) \end{bmatrix}$$

$$B_{11} = \frac{(-\lambda_2 e^{\lambda_1 x} + \lambda_1 e^{\lambda_2 x})}{\sqrt{A_{22}^2 + 4A_{12}A_{21}}}, \quad B_{12} = \frac{A_{12}(e^{\lambda_1 x} - e^{\lambda_2 x})}{\sqrt{A_{22}^2 + 4A_{12}A_{21}}},$$

$$B_{21} = \frac{A_{21}(e^{\lambda_1 x} - e^{\lambda_2 x})}{\sqrt{A_{22}^2 + 4A_{12}A_{21}}}, \quad B_{22} = \frac{(\lambda_1 e^{\lambda_1 x} - \lambda_2 e^{\lambda_2 x})}{\sqrt{A_{22}^2 + 4A_{12}A_{21}}},$$

$$\lambda_{1,2} = \frac{A_{22} \pm \sqrt{A_{22}^2 + 4A_{12}A_{21}}}{2}.$$

Column 18, Lines 55-60, Expression 5 should appear as follows:

$$Q = H - W = -\frac{1}{2}\mathrm{Re}\left[\frac{\chi_\alpha - \tilde{\chi}_\nu}{(1+\sigma)(1-\tilde{\chi}_\nu)} p \cdot \tilde{U}\right] + \frac{C_p \rho_m}{A_c 2\omega}\mathrm{Im}\left[\frac{\chi_\alpha - \sigma\chi_\nu}{|1-\chi_\nu|^2(1-\sigma^2)}\right]|U|^2 \frac{dT_m}{dx}$$

Signed and Sealed this
Second Day of January, 2018

Joseph Matal
*Performing the Functions and Duties of the*
*Under Secretary of Commerce for Intellectual Property and*
*Director of the United States Patent and Trademark Office*